United States Patent
Daggett et al.

(10) Patent No.: US 11,913,408 B1
(45) Date of Patent: Feb. 27, 2024

(54) TRUNNION-TO-DISK CONNECTION FOR AN OPEN FAN CONFIGURATION AIRCRAFT POWERPLANT

(71) Applicants: General Electric Company, Schenectady, NY (US); GE Aviation Systems Limited, Cheltenham (GB)

(72) Inventors: Nicholas M. Daggett, Camden, ME (US); Frank Worthoff, West Chester, OH (US); Pawel Pres, Cheltenham (GB); Daryl John Burford, Gloucester (GB)

(73) Assignees: General Electric Company, Schenectady, NY (US); GE Aviation Systems Limited, Cheltenham (GB)

( * ) Notice: Subject to any disclaimer, the term of this patent is extended or adjusted under 35 U.S.C. 154(b) by 0 days.

(21) Appl. No.: 18/301,405

(22) Filed: Apr. 17, 2023

(51) Int. Cl.
*F02K 3/08* (2006.01)
*F02K 3/06* (2006.01)
*F04D 29/60* (2006.01)
*F04D 29/34* (2006.01)

(52) U.S. Cl.
CPC ................ *F02K 3/06* (2013.01); *F04D 29/34* (2013.01); *F04D 29/601* (2013.01)

(58) Field of Classification Search
CPC ........... F02K 3/06; F04D 29/34; F04D 29/601
See application file for complete search history.

(56) References Cited

U.S. PATENT DOCUMENTS

| | | |
|---|---|---|
| 2,248,590 A | 7/1941 | Smith |
| 3,490,537 A | 1/1970 | Quenneville |
| 3,799,699 A | 3/1974 | Master et al. |
| 4,850,801 A | 7/1989 | Valentine |
| 4,921,403 A | 5/1990 | Poucher et al. |
| 5,118,256 A | 6/1992 | Violette et al. |
| 5,431,541 A | 7/1995 | Shaffer |
| 6,213,719 B1 | 4/2001 | Violette et al. |
| 7,422,419 B2 | 9/2008 | Carvalho |
| 8,801,383 B2 | 8/2014 | Soule |
| 10,072,510 B2 | 9/2018 | Miller et al. |
| 10,371,096 B2 | 8/2019 | Miller et al. |
| 10,549,842 B2 | 2/2020 | Andrzejewski |
| 11,225,975 B2 | 1/2022 | Miller et al. |

(Continued)

FOREIGN PATENT DOCUMENTS

WO WO202218356 A1 1/2022

*Primary Examiner* — Shafiq Mian
(74) *Attorney, Agent, or Firm* — Dority & Manning, P.A.

(57) ABSTRACT

A trunnion-to-disk connection for use on an open fan configuration of a gas turbine engine may include an integral trunnion and blade spar inserted through a trunnion aperture of a fan disk and supported by top bearing and a bottom bearing. A cavity can be provided between a trunnion of the integral trunnion and blade spar and the fan disk, as well as between the top bearing and bottom bearing. Pressurized hydraulic fluid can be supplied to the cavity to urge the integral trunnion and blade spar in a direction to preload the bearings. Prior to pressurization, and prior to installation of the bottom bearing, the trunnion can be inserted into a trunnion aperture of the fan disk such that an end of the trunnion extends past the fan disk to provide sufficient space to insert the bottom bearing from within the open interior of the fan disk.

11 Claims, 26 Drawing Sheets

(56) References Cited

U.S. PATENT DOCUMENTS

| | | | |
|---|---|---|---|
| 2014/0169950 A1* | 6/2014 | Dube | F01D 17/162 |
| | | | 156/60 |
| 2019/0093503 A1* | 3/2019 | Miller | F01D 21/045 |
| 2020/0056491 A1* | 2/2020 | Bailey | F01D 5/323 |
| 2022/0372884 A1 | 11/2022 | Kray et al. | |

* cited by examiner

TRUNNION-TO-DISK CONNECTION FOR AN OPEN FAN CONFIGURATION AIRCRAFT POWERPLANT

FIELD

The present disclosure relates to trunnion-to-disk connection for a turbofan engine and a turbofan engine including the same.

BACKGROUND

A gas turbine engine generally includes a turbomachine and a rotor assembly. Gas turbine engines, such as turbofan engines, may be used for aircraft propulsion. In the case of a turbofan engine, the rotor assembly may include a plurality of unducted rotor blades. It is desirable to provide a robust connection between each of the plurality of unducted rotor blades and a trunnion while also providing for ease of manufacturing. Improvements to trunnion-to-disk connections would be useful in the art.

BRIEF DESCRIPTION OF THE DRAWINGS

A full and enabling disclosure of the presently described technology, including the best mode thereof, directed to one of ordinary skill in the art, is set forth in the specification, which makes reference to the appended figures, in which.

DETAILED DESCRIPTION

Figure 1:
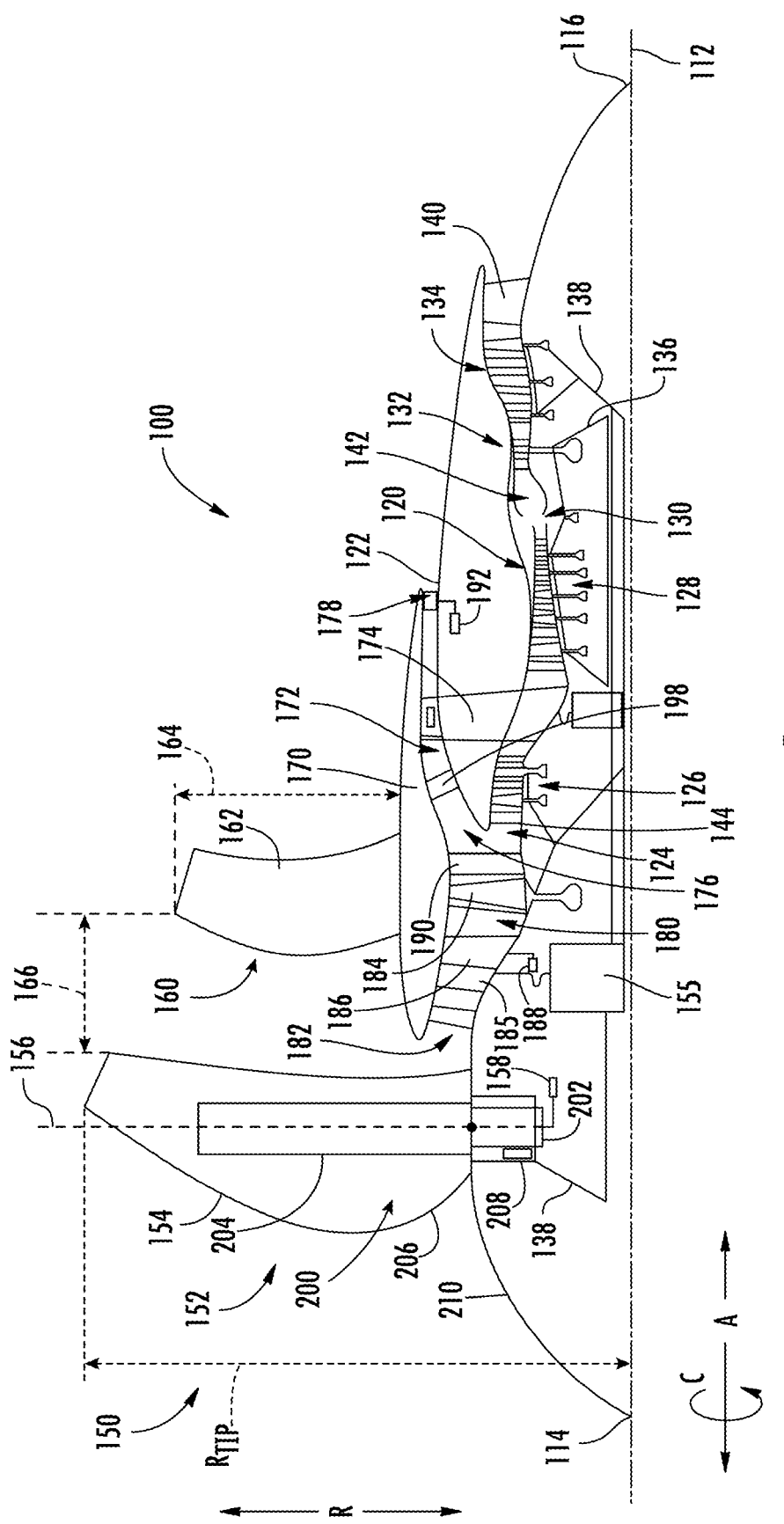
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "axial" and "axially" refer to directions and orientations that extend substantially parallel to a reference axis. Moreover, the terms "radial" and "radially" refer to directions and orientations that extend substantially perpendicular to the reference axis. In addition, as used herein, the terms "circumferential" and "circumferentially" refer to directions and orientations that extend arcuately about the reference axis.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

A "third stream" as used herein means a non-primary air stream capable of increasing fluid energy to produce a minority of total propulsion system thrust. The third stream may generally receive inlet air (air from a ducted passage downstream of a primary fan) instead of freestream air (as the primary fan would). A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

As will be discussed in more detail below, the subject matter of the present disclosure is directed generally to connecting an integral trunnion and blade spar to a fan disk of an open fan configuration of a gas turbine engine. The integral trunnion and blade spar can be connected to the fan disk through a trunnion-to-disk connection which includes a top bearing and a bottom bearing disposed between the fan disk and the trunnion of the integral trunnion and blade spar. A cavity can be provided between the trunnion and fan disk and between the top bearing and bottom bearing. A hydraulic lift can be provided to supply hydraulic fluid to the cavity and cause relative movement and/or stress to develop between the trunnion and the fan disk. A foot of the trunnion can engage a lower race of a bottom bearing upon pressurization of the cavity by the hydraulic lift. During an installation process the integral trunnion and blade spar can be inserted such that a second end of the trunnion extends past the open fan disk to provide sufficient space to install the bottom bearing. The open disk includes a large open interior sufficient to install rolling elements of the lower bearing in an axial direction with respect to a central aperture axis which, in some forms, is transverse to a longitudinal axis of the gas turbine engine. After installation of the bottom bearing the hydraulic lift can be activated to pressurize the cavity and preload the bearings, at which point a spanner nut can be tightened to lock the assembly in place. It is envisioned herein that the trunnion-to-disk connection can be applied to a high blade count, high radius ratio open fan (e.g., an unducted single fan) engine. Unducted single fan architectures require higher blade solidity relative to existing turboprop applications to enable high velocity cruise speeds. Higher blade counts require higher radius ratio fan disks. Unducted single fan designs, such as those in which integral trunnion and blade spars disclosed herein may be connected to a fan disk, may have blade counts greater than 10 and radius ratios greater than Vibratory blade loading may be higher than existing turboprop applications due to higher flight velocities. As a result, larger bearings and bearing spacing are required to maintain contact stress requirements.

Referring now to FIG. 1, a schematic cross-sectional view of a gas turbine engine 100, also referred to herein as "engine 100", is provided according to an example embodiment of the present disclosure. Particularly, FIG. 1 provides a turbofan engine having a rotor assembly with a single stage of unducted rotor blades. In such a manner, the rotor assembly may be referred to herein as an "unducted fan," or the entire engine 100 may be referred to as a "turbofan engine" or an "unducted turbofan engine." In addition, the engine 100 of FIG. 1 includes a third stream extending from the compressor section to a rotor assembly flowpath over the turbomachine, as will be explained in more detail below.

For reference, the engine 100 defines an axial direction A, a radial direction R, and a circumferential direction C. Moreover, the engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The engine 100 extends between a forward end 114 and an aft end 116, e.g., along the axial direction A.

The engine 100 includes a turbomachine 120 and a rotor assembly, also referred to a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. In such a manner, the engine 100 may be referred to as an open rotor or open fan engine.

As depicted, the fan 152 includes an array of fan blades 154 (only one shown in FIG. 1). The fan blades 154 are rotatable, e.g., about the longitudinal axis 112. As noted above, the fan 152 is drivingly coupled with the low pressure turbine 134 via the LP shaft 138. For the embodiments shown in FIG. 1, the fan 152 is coupled with the LP shaft 138 via a speed reduction gearbox 155, e.g., in an indirect-drive or geared-drive configuration.

Moreover, the array of fan blades 154 can be arranged in equal spacing around the longitudinal axis 112. Each fan blade 154 has a root and a tip and a span defined therebetween, and more specifically defines a tip radius Rim) from the longitudinal axis 112 to the tips of the fan blades 154 along the radial direction R. Each fan blade 154 defines a central blade axis 156. For this embodiment, each fan blade 154 of the fan 152 is rotatable about its central blade axis 156, e.g., in unison with one another. One or more actuators 158 are provided to facilitate such rotation and therefore may be used to change a pitch of the fan blades 154 about their respective central blades' axes 156.

The fan section 150 further includes an outlet guide vane array 160 that includes outlet guide vanes 162 (only one shown in FIG. 1; sometimes also referred to as fan guide vanes) disposed around the longitudinal axis 112. For this embodiment, the outlet guide vanes 162 are not rotatable about the longitudinal axis 112. Each outlet guide vane 162 has a root and a tip and a span defined therebetween. The outlet guide vanes 162 may be unshrouded as shown in FIG. 1 or, alternatively, may be shrouded, e.g., by an annular shroud spaced outward from the tips of the outlet guide vanes 162 along the radial direction R or attached to the outlet guide vanes 162.

As will be appreciated, the outlet guide vanes 162 each define an outlet guide vane (OGV) span 164 along the radial direction R from a root to a tip. Additionally, the outlet guide vanes 162 are spaced from the fan blade 154 along the axial direction A by a distance or spacing 166. The spacing 166 is measured from an aft-most edge of the fan blade 154 to a forward-most edge of the outlet guide vanes 162 along the axial direction A.

In the embodiment depicted, as noted above, each outlet guide vane 162 is configured as a fixed guide vane, unable to be pitched about a central blade axis. The outlet guide vanes 162 are thus mounted to a fan cowl 170 in a fixed manner.

It will be appreciated, however, that in other embodiments, the outlet guide vanes 162 may alternatively be variable pitch outlet guide vanes 162.

As shown in FIG. 1, in addition to the fan 152, which is unducted, a ducted fan 184 is included aft of the fan 152, such that the engine 100 includes both a ducted and an unducted fan which both serve to generate thrust through the movement of air without passage through at least a portion of the turbomachine 120 (e.g., without passage through the HP compressor 128 and combustion section for the embodiment depicted). The ducted fan 184 is rotatable about the same axis (e.g., the longitudinal axis 112) as the fan blade 154. The ducted fan 184 is, for the embodiment depicted, driven by the low pressure turbine 134 (e.g. coupled to the LP shaft 138). In the embodiment depicted, as noted above, the fan 152 may be referred to as the primary fan, and the ducted fan 184 may be referred to as a secondary fan. It will be appreciated that these terms "primary" and "secondary" are terms of convenience, and do not imply any particular importance, power, or the like.

The ducted fan 184 includes a plurality of fan blades (not separately labeled in FIG. 1) arranged in a single stage, such that the ducted fan 184 may be referred to as a single stage fan. The fan blades of the ducted fan 184 can be arranged in equal spacing around the longitudinal axis 112. Each blade of the ducted fan 184 has a root and a tip and a span defined therebetween.

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan duct flowpath, or simply a fan duct 172. According to this embodiment, the fan flowpath or fan duct 172 may be understood as forming at least a portion of the third stream of the engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl 122.

The engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the outlet guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a fan duct splitter or leading edge 144 of the core cowl 122. In the embodiment depicted, the inlet duct 180 is wider than the core duct 142 along the radial direction R. The inlet duct 180 is also wider than the fan duct 172 along the radial direction R.

Notably, for the embodiment depicted, the engine 100 includes one or more features to increase an efficiency of a third stream thrust, $Fn_{3S}$ (e.g., a thrust generated by an airflow through the fan duct 172 exiting through the fan exhaust nozzle 178, generated at least in part by the ducted fan 184). In particular, the engine 100 further includes an array of inlet guide vanes 186 positioned in the inlet duct 180 upstream of the ducted fan 184 and downstream of the engine inlet 182. The array of inlet guide vanes 186 are arranged around the longitudinal axis 112. For this embodiment, the inlet guide vanes 186 are not rotatable about the longitudinal axis 112. Each inlet guide vanes 186 defines a central blade axis (not labeled for clarity), and is rotatable about its respective central blade axis, e.g., in unison with one another. In such a manner, the inlet guide vanes 186 may be considered a variable geometry component. One or more actuators 188 are provided to facilitate such rotation and therefore may be used to change a pitch of the inlet guide vanes 186 about their respective central blade axes. However, in other embodiments, each inlet guide vanes 186 may be fixed or unable to be pitched about its central blade axis.

Further, located downstream of the ducted fan 184 and upstream of the fan duct inlet 176, the engine 100 includes an array of outlet guide vanes 190. As with the array of inlet guide vanes 186, the array of outlet guide vanes 190 are not rotatable about the longitudinal axis 112. However, for the embodiment depicted, unlike the array of inlet guide vanes 186, the array of outlet guide vanes 190 are configured as fixed-pitch outlet guide vanes.

Further, it will be appreciated that for the embodiment depicted, the fan exhaust nozzle 178 of the fan duct 172 is further configured as a variable geometry exhaust nozzle. In such a manner, the engine 100 includes one or more actuators 192 for modulating the variable geometry exhaust nozzle. For example, the variable geometry exhaust nozzle may be configured to vary a total cross-sectional area (e.g., an area of the nozzle in a plane perpendicular to the longitudinal axis 112) to modulate an amount of thrust generated based on one or more engine operating conditions (e.g., temperature, pressure, mass flowrate, etc. of an airflow through the fan duct 172). A fixed geometry exhaust nozzle may also be adopted.

The combination of the array of inlet guide vanes 186 located upstream of the ducted fan 184, the array of outlet guide vanes 190 located downstream of the ducted fan 184, and the fan exhaust nozzle 178 may result in a more efficient generation of third stream thrust, $Fn_{3S}$, during one or more engine operating conditions. Further, by introducing a variability in the geometry of the inlet guide vanes 186 and the fan exhaust nozzle 178, the engine 100 may be capable of generating more efficient third stream thrust, $Fn_{3S}$, across a relatively wide array of engine operating conditions, including takeoff and climb (where a maximum total engine thrust $Fn_{Total}$, is generally needed) as well as cruise (where a lesser amount of total engine thrust, $Fn_{Total}$, is generally needed).

Moreover, referring still to FIG. 1, in exemplary embodiments, air passing through the fan duct 172 may be relatively cooler (e.g., lower temperature) than one or more fluids utilized in the turbomachine 120. In this way, one or more heat exchangers 198 may be positioned in thermal communication with the fan duct 172. For example, one or more heat exchangers 198 may be disposed within the fan duct 172 and utilized to cool one or more fluids from the core engine with the air passing through the fan duct 172, as a resource for removing heat from a fluid, e.g., compressor bleed air, oil or fuel.

Although not depicted, the heat exchanger 198 may be an annular heat exchanger extending substantially 360 degrees in the fan duct 172 (e.g., at least 300 degrees, such as at least 330 degrees). In such a manner, the heat exchanger 198 may effectively utilize the air passing through the fan duct 172 to cool one or more systems of the engine 100 (e.g., lubrication oil systems, compressor bleed air, electrical components, etc.). The heat exchanger 198 uses the air passing through duct 172 as a heat sink and correspondingly increases the temperature of the air downstream of the heat exchanger 198 and exiting the fan exhaust nozzle 178.

It will be appreciated, that for the purposes of discussion in the present disclosure, the ducted fan 184, the fan cowl 170, the inlet duct 180, and the fan duct 172 may all be considered part of the turbomachine 120.

It will be appreciated that the exemplary turbofan engine 100 depicted in FIG. 1 is provided by way of example only, and that in other embodiments, the turbofan engine 100 may have any other suitable configuration. For example, in other embodiments, the turbofan engine 100 may not include the fan duct 172/third stream, and as such may be configured as a "two stream" engine. Additionally, or alternatively, in other embodiments, the turbofan engine 100 may be configured as a direct drive engine (i.e., without the gearbox 155), as a fixed-pitch engine (i.e., without the pitch change mechanism/actuator(s) 158), etc.

The rotor assembly can also include a spinner cone 210 fastened on a forward end of the rotor assembly to provide for an aerodynamic flow path required to reach the radial location of the engine inlet 182.

With particular respect to the fan blades 154 of the rotor assembly discussed above, in one exemplary form the fan blades 154 include an integral trunnion and blade spar 200 having a trunnion 202 and blade spar 204 upon which is coupled a fan airfoil 206 through a physical attachment or bonding process. The integral trunnion and blade spar 200 can be made as an integral component through any suitable manufacturing process, including but not limited to any suitable bonding process, such as through metallurgical bonding, or casting process, or physical attachment process, to set forth just a few non-limiting examples. In one form the trunnion 202 is integral with the blade spar 200 where both are of metallic material in one form, or metallic/polymatrix composite (PMC) hybrid in another form. Other material types are also contemplated.

The trunnion 202 of the integral trunnion and blade spar 200 is coupled to a fan disk 208 that is driven by the LP shaft 138. The connection point of the LP shaft 138 to the fan disk 208 is indicated in FIG. 1 as being located on an axial forward end of the fan disk 208, but in other embodiments, the LP shaft 138 can be connected to the fan disk 208 in other locations, including on an axial aft end of the fan disk 208. The coupled connection between the trunnion 202 of the integral trunnion and blade spar 200 will be described further below.

Figure 2:
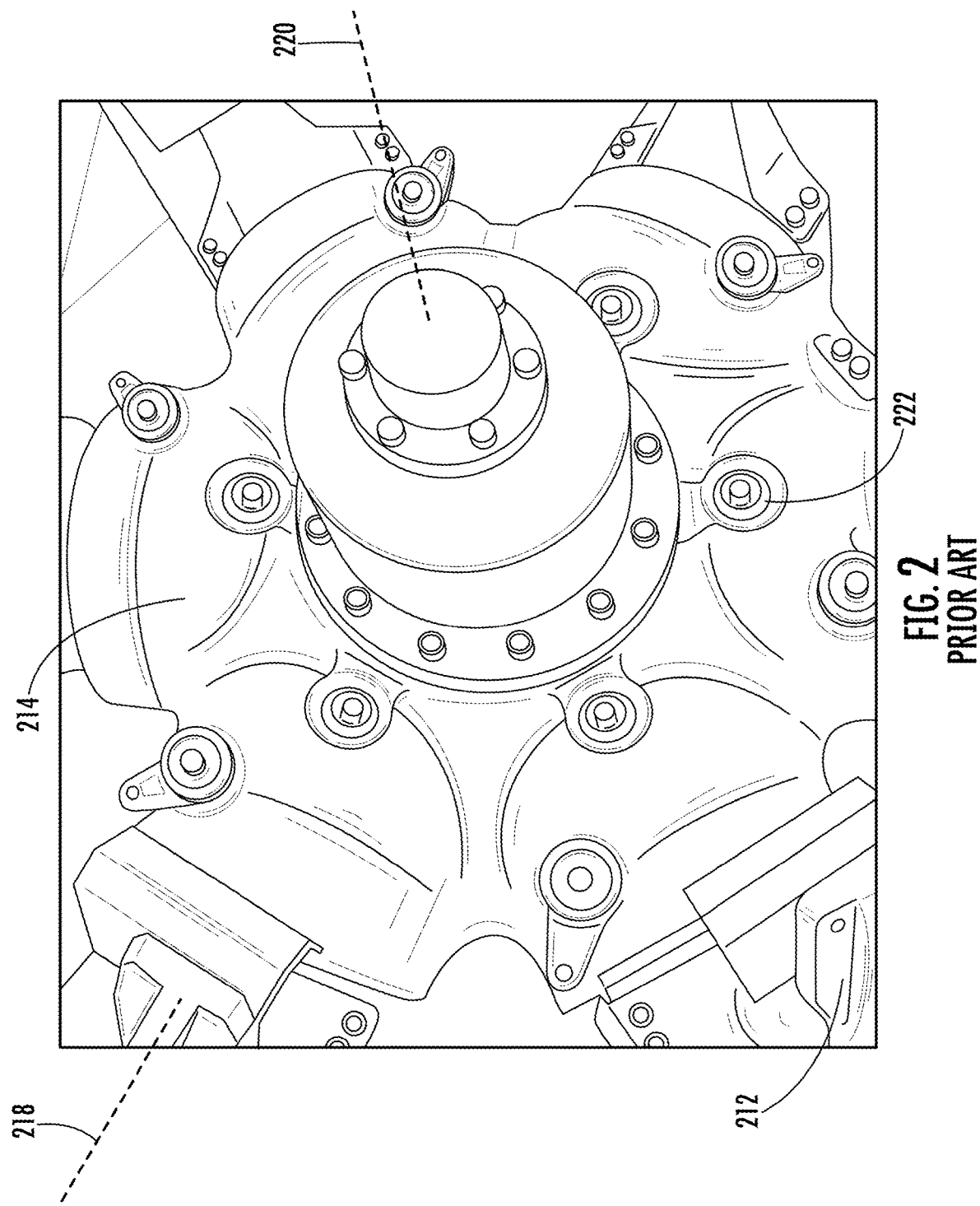
FIG. 2 is a schematic of a prior art propeller hub for a propeller driven aircraft.
Figure 3:
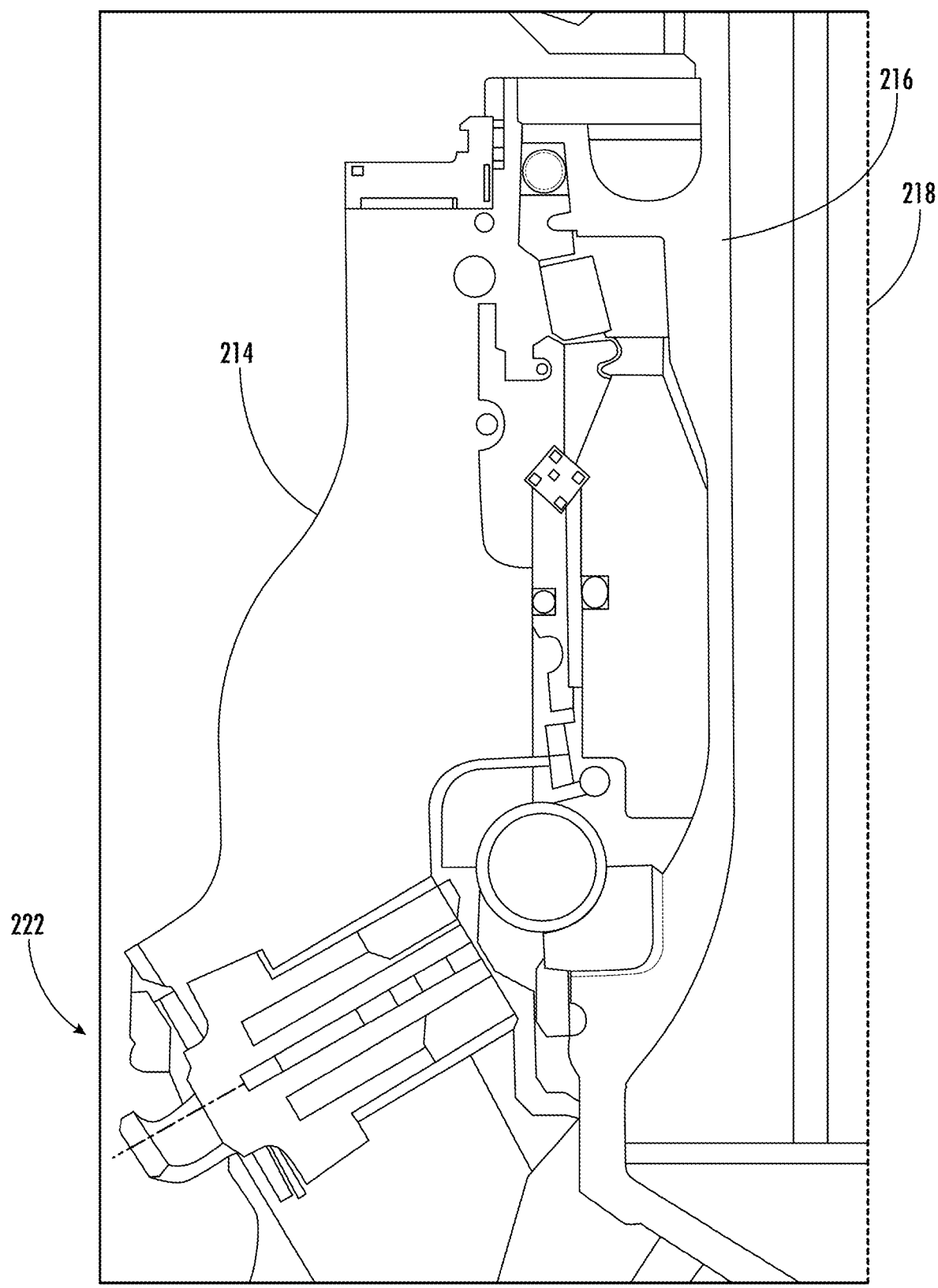
FIG. 3 is a schematic of a prior art support for a propeller connected to a propeller hub.

FIGS. 2 and 3 depict a prior art example of a propeller driven engine which includes an assembly used to couple propeller blades 212 to a propeller hub 214. Each of the propellers extend along a propeller axis 218, and the entire propeller assembly rotates about an engine axis 220. The propeller blades 212 can be integral with a trunnion 216 and are coupled via the trunnion 216 to the propeller hub 214 as depicted in FIG. 3. A similar coupling is also depicted in U.S. Pat. No. 4,921,403. Of note in FIG. 2, the hub radially extends substantially to the engine axis 220. Also, of note in FIG. 2, a rolling element required for the lower bearing must be installed via a bearing port 222 in an axial direction along the engine axis 220 through a wall of the propeller hub 214. After final installation the propeller hub 214 is flooded with a lubricant, such as grease, which is shared among the lower bearings for each of the separate trunnions associated with the propeller blades. During operation, the lubricant is flung radially outward and falls back after engine operation. Existing turboprop applications in which the construction of FIGS. 2 and 3 may be used do not require high blade solidity due to lower cruise velocities. Lower blade counts enable lower radius ratio fan disks. Turboprop designs, such as those that may use the constructions of FIGS. 2 and 3, may have blade counts less than 10 and radius ratios less than 0.200.

Figure 4:
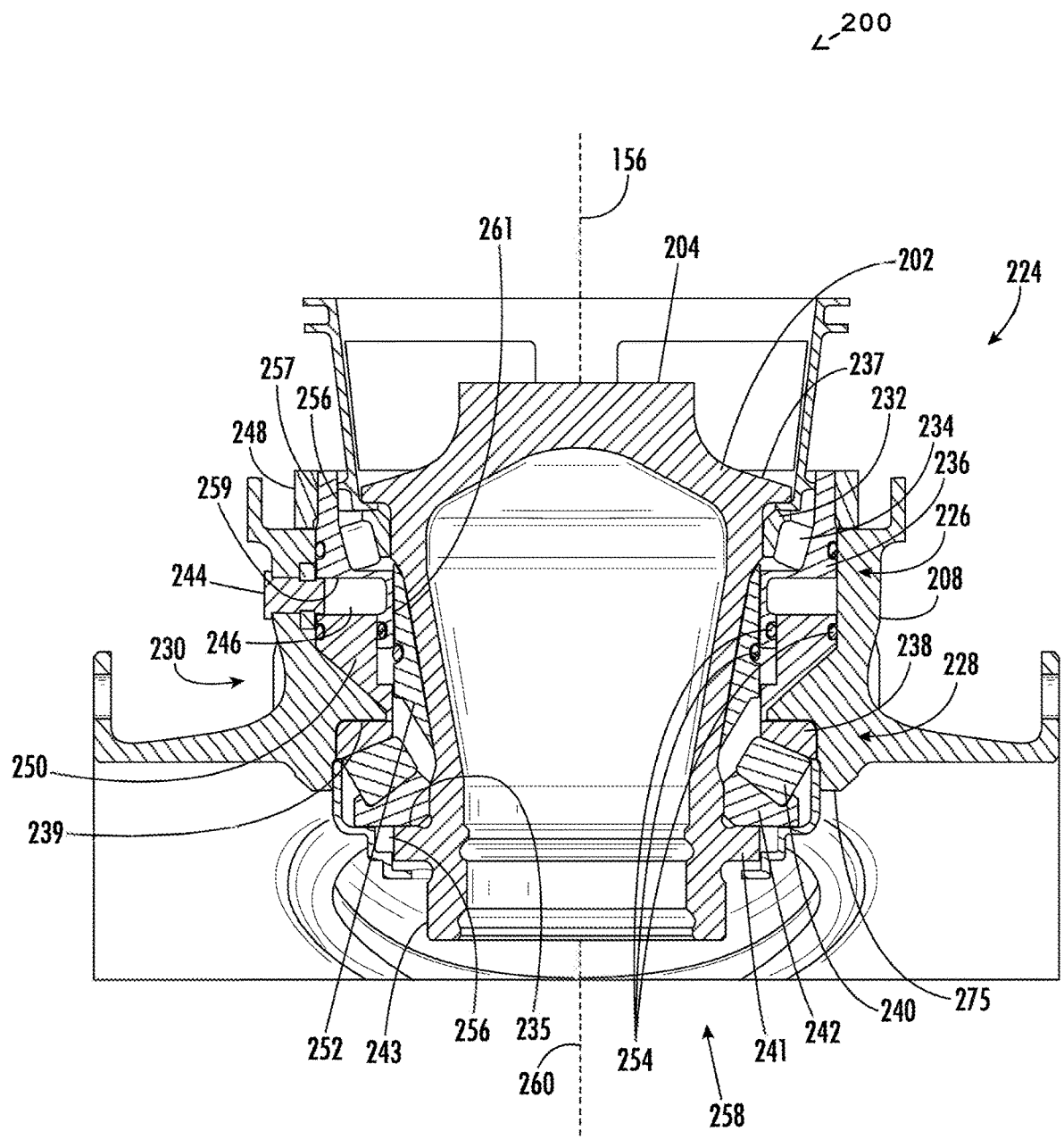
FIG. 4 is a schematic view of a trunnion-to-disk connection in accordance with an exemplary aspect of the present disclosure.

Turning now to FIG. 4, the trunnion 202 is coupled to the fan disk 208 through a trunnion-to-disk connection 224 which includes a top bearing 226, a bottom bearing 228, and a hydraulic lift 230. As will be appreciated, the top bearing 226 and bottom bearing 228 aid in positioning and supporting the trunnion 202 within the fan disk 208, but also crucially permit relative motion to occur between the trunnion 202 and the fan disk 208. The top bearing 226 can be used in some forms to provide a wheelbase to react a moment during operation of the fan blades 154. The bottom bearing 228 can be used in some forms to provide a primary radial retention of the fan blades 154. During an assembly process, the hydraulic lift 230 is used to provide translation of the trunnion 202 relative to the fan disk 208 as will be described further below.

The top bearing 226 includes an upper race 232, a rolling element 234 (shown without cross hatching in FIG. 4 to indicate an out-of-plane view), and a lower race 236. The upper race 232 is press fit or otherwise connected with the trunnion 202 and can rotate and/or translate with the trunnion 202 during operation of the fan blades 154 (FIG. 1) and/or installation of the trunnion 202 with the fan disk 208. In the illustrated embodiment, the rolling elements 234 are depicted as roller bearings, but other embodiments can incorporate different types of rolling elements, such as, but not limited to, ball or spherical bearings. Other embodiments disclosed herein illustrate other bearing types. The lower race 236 is either captured by or serves as a bearing carrier capable of translating with the trunnion 202 during an installation procedure of the integral trunnion and blade spar 204 to the fan disk 208. In some forms, the lower race 236 can be connected with the fan disk 208 through a pin, pilot feature, etc. which can serve to rotatingly lock the lower race 236 to the fan disk 208. A lubricant can be provided within the top bearing 226. The top bearing 226 is located near a first end 237 of the trunnion 202, where such first end 237 will be distinguished from another end of the trunnion 202 in which the bottom bearing 228 is located.

The bottom bearing 228 is separable (e.g., separate components can be manipulated and installed separately) and includes an upper race 238, rolling element 240, and a lower race 242. The upper race 238 is press fit or otherwise connected with the fan disk 208, such as via an overhang 239 formed in the fan disk 208. In some forms, the upper race 238 can be connected with the fan disk 208 through a pin, pilot feature, etc. which can serve to rotatingly lock the upper race 238 to the fan disk 208. In the illustrated embodiment the rolling elements 240 are depicted as tapered roller bearings, but other embodiments can incorporate different types of rolling elements, such as, but not limited to, ball or spherical bearings. Other embodiments disclosed herein illustrate other bearing types. The lower race 242 is press fit or otherwise connected with the trunnion 202 and can rotate and/or translate with the trunnion during operation of the fan blades 154 (FIG. 1) and/or installation of the trunnion 202 with the fan disk 208. The lower race 242 of the bottom bearing 228 abuts a bearing contact surface 235 of a foot 241 of the trunnion 202 which can provide support to the lower race 242 over all or a portion of the width of the lower race 242. A lubricant can be provided within the top bearing 226. The bottom bearing 228 is located near a second end 243 of the trunnion 202, where the second end 243 is opposite the first end 237. In one form the top bearing 226 and the bottom bearing 228 are located between the first end 237 and the second end 243.

The hydraulic lift 230 includes a hydraulic port 244 to which a suitable hydraulic fitting can be attached to deliver a hydraulic material, such as, but not limited to, grease, through the hydraulic port 244 and into a cavity 246. The hydraulic port 244 and the cavity 246 are structured to receive a high pressure hydraulic fluid to cause movement and/or impart stress between the trunnion 202 and the fan disk 208. The cavity 246 is defined between the lower race 236 of the top bearing 226 and the upper race 238 of the bottom bearing 228, and is also defined between an inner wall of the fan disk 208 and the outer surface of the trunnion 202. Prior to pressurization, the trunnion 202 can be translated to change the height of the cavity 246 since the top bearing 226 and trunnion 202 are permitted to slide in place. For example, when the cavity 246 is under no pressure from a hydraulic fluid, the trunnion 202 can be translated to collapse the cavity 246 to a minimum height. When the cavity 246 is under pressure, however, the trunnion 202 can be translated to expand the cavity 246 to a maximum height as will be discussed further below. When pressurized hydraulic fluid is received within cavity 246 such pressure compresses the top bearing 226 but also urges the lower race 236 of the top bearing 226 to translate in a direction from the second end 243 to the first end 237 and thereby compresses the bottom bearing 228 between the foot 241 of the trunnion 202 and the overhang 239 of the fan disk 208. Pressurizing the cavity 246 permits the top bearing 226 and the bottom bearing 228 to be preloaded.

A spanner nut 248 can be affixed to lock the trunnion 202 in place. In one form the spanner nut 248 is a threaded nut affixed to a bearing carrier that forms the upper race 232 of the top bearing 226 as shown in the embodiment depicted in FIG. 4. Other intermediate structure can also be used. When the cavity 246 of the hydraulic lift 230 is fully pressurized and the top bearing 226 and bottom bearing 228 are in a preloaded state, the spanner nut 248 can be threaded into place. In some embodiments, the spanner nut 248 can be hand tightened, but in other embodiments, the spanner nut 248 can be torqued into place through appropriate tooling. Once the spanner nut 248 is in place the hydraulic fitting connected to the hydraulic port 244 can be disconnected and a port cover inserted to close off the hydraulic port 244.

A number of inserts can be used to occupy space defined between the lower race 236 of the top bearing 226 and the upper race 238 of the bottom bearing 228, and also defined between an inner wall of the fan disk 208 and the outer surface of the trunnion 202. Such inserts can be connected to either of the trunnion 202 or the fan disk 208. Depicted in FIG. 4 are inserts 250 and 252. The inserts 250 and 252 can take a variety of forms including, but not limited to, foam inserts. In one form, the foam inserts 250 and 252 can be a closed foam construction formed from any suitable material, including but not limited to foamed metal. The foam inserts 250 and 252 can be used to decrease the volume needed when supplying hydraulic fluid to urge the trunnion 202 to move and therefore create loading upon the top bearing 226 and the bottom bearing 228.

The construction depicted in FIG. 4 includes the use of several sealing elements to prevent intrusion of foreign materials and/or leakage of lubricant. O-rings 254 can be used to seal between various stationary and moving parts. For example, an O-ring 254 is located between the relatively stationary foam insert 250 and an inner surface of the fan disk 208. An O-ring 254 is also located between the foam insert 252 and the bearing carrier of the top bearing 226, where such O-ring permits sliding movement between the bearing carrier of the top bearing 226 and the foam insert 250. A C-shaped seal 256 can be used in locations to aid in sealing between parts that have relative movement. An example of a C-shaped seal is illustrated further below in FIG. 8. It will be appreciated that other types of seals can be used besides O-rings 254 and C-shaped seals 256. In fact, in some forms any of the O-rings 254 can be used in place of any C-shaped seals 256, and vice versa, depending on the application.

The lower race 236 of the top bearing 226 includes not only the race for the rolling elements 234, but also includes an upturned leg 257, a base 259, and a downturned leg 261. The upturned leg 257 extending in the direction of travel of the trunnion 202 when the cavity is pressurized abuts an inner surface of the fan disk 208, which interface also includes a seal in the form of an O-ring 254. A bottom facing surface of the base 259 defines a top portion of the cavity 246. The downturned leg 261 is oriented opposite the upturned leg 257 relative to the base 259 and is located between the insert 250 and insert 252. The downturned leg 261 also defines a wall of the cavity 246. Although only a single seal is depicted between the downturned leg 261 and the insert 250 owing to the relative movement between those parts when the trunnion 202 is moved as a result of pressurizing the cavity 246, another seal could also be used between the downturned leg 261 and the insert 252.

Figure 5:
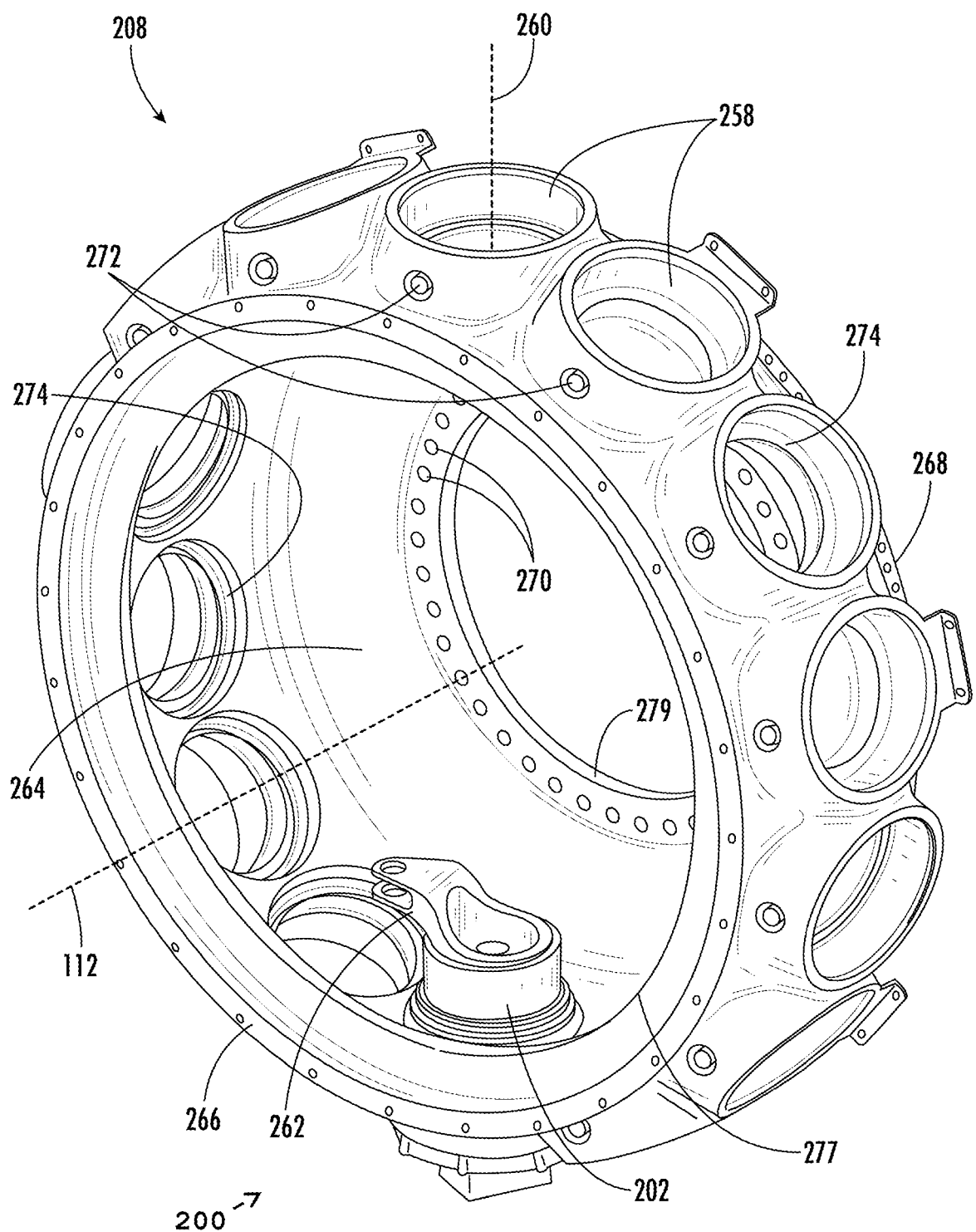
FIG. 5 is a schematic view of a fan disk in accordance with an exemplary aspect of the present disclosure.

Referencing now both FIGS. 4 and 5, the fan disk 208 includes several features including a plurality of trunnion apertures 258 each of which is constructed to receive an associated integral trunnion and blade spar 200 such as that illustrated in FIG. 4. Each of the trunnion apertures 258 is arranged along a central aperture axis 260 along which the trunnion 202 is inserted. When inserted, the trunnion 202 can be rotated about the central aperture axis 260 to rotate the fan blades 154, where such rotation can be accomplished by a bell crank 262 attached to the trunnion 202. An actuator (e.g., 158 from FIG. 1) can be used to manipulate the orientation of the bell crank 262, and therefore the orientation of the fan blades 154. It will be appreciated that the central blade axis 156 (FIG. 1) can be coincident with the central aperture axis 260 in some embodiments, but in other embodiments need not be coincident. It will also be appreciated that the central blade axis 156 and central aperture axis 260 are substantially transverse to the longitudinal axis 112 (FIG. 1). In some forms either or both of the central blade axis 156 and central aperture axis 260 are perpendicular to the longitudinal axis 112

The fan disk 208 is annular in shape and includes several provisions to incorporate it into the gas turbine engine 100 (FIG. 1). The annular shape includes a large open interior 264 within which an installation procedure of the bottom bearing 228 can be performed as discussed further below. The fan disk 208 is constructed to rotate about the longitudinal axis 112 when installed on the gas turbine engine 100. A forward end 266 can be coupled with the spinner cone 210, and a rear end 268 to the LP shaft 138 via a plurality of fasteners inserted through respective ones of a plurality of fastener apertures 270. Various fastening techniques are contemplated for both of the forward end 266 to the spinner cone 210 and the rear end 268 to the LP shaft 138. Furthermore, in some embodiments, additional components, structural or otherwise, may be coupled between the forward end 266 and spinner cone 210 as well as between the rear end 268 and the LP shaft 138.

The fan disk 208 also includes other several provisions to aspects of the trunnion-to-disk connection 224. For example, the fan disk 208 includes a lubricant passage 272 which is sized to receive an insert for the hydraulic port 244. The fan disk 208 also includes a spanner nut bearing surface 274 sized to support and bear against the spanner nut 248 to provide preloading on the top bearing 226 and bottom bearing 228. The fan disk 208 also includes a disk bearing surface in the form of overhang 239 sized to support and bear against the upper race 238 of the bottom bearing 228. The fan disk 208 also includes a portion of the inner surface designated at 275 in FIG. 4 which indicates the minimum radius of the fan disk 208 at the location aligned with the trunnion aperture 258. The bearing contact surface 235 is at a radius from the longitudinal axis 112 that is less than the minimum radius of the fan disk 208 from the longitudinal axis 112 at that portion of the inner surface designed at 275 which represents the location aligned with the trunnion aperture 258. The fan disk 208 can include an axial forward end having a minimum radius 277 from the longitudinal axis 112 and an axial aft end with a minimum radius 279 from the longitudinal axis 112. The radius of the bearing contact surface 235 from the longitudinal axis 112 can, but need not, be less than either or both of the minimum radii 277 and 279.

Figure 6:
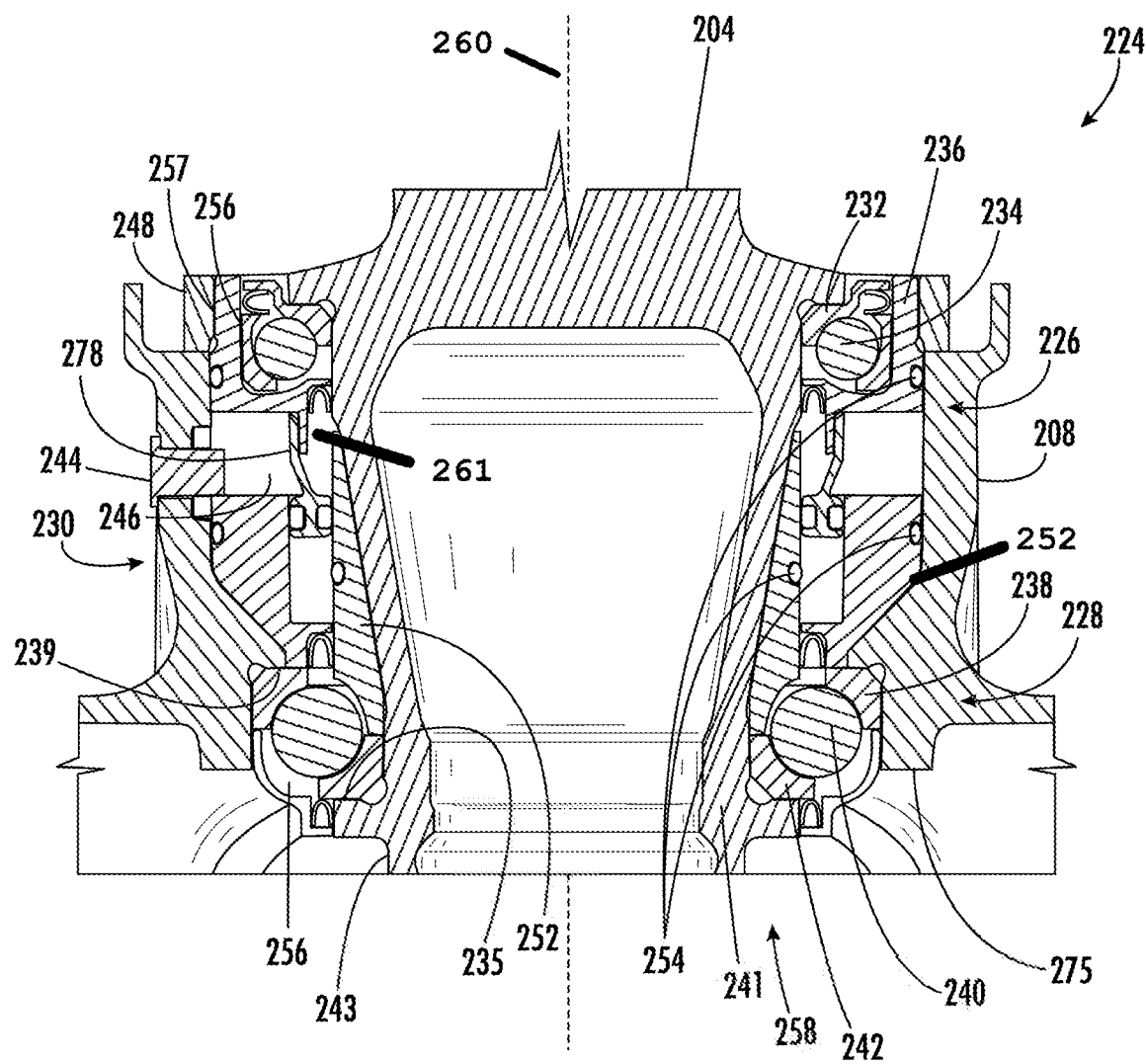
FIG. 6 is a schematic view of a trunnion-to-disk connection in accordance with another exemplary aspect of the present disclosure.

Turning now to FIG. 6, and with reference to FIG. 4, another embodiment of the trunnion-to-disk connection 224 is illustrated. Like reference numerals refer to like elements. Differences in the embodiment illustrated in FIG. 6 include a shortened downturned leg 261 of the lower race 236 of the top bearing 226. Instead of extending the downturned leg 261 to a location between the insert 250 and 252, an additional component 278 is inserted having a first portion located between the inserts 250 and 252, and a second portion extending axially away from the first portion that abuts the downturned leg 261 on a radially outer side of the downturned leg 261 (where 'radially' in this sense is measured from the central aperture axis 260). Seals are provided on either side of the first portion which abuts the insert 250 and insert 252. The bottom bearing 228 also includes one portion of the bearing race formed in the insert 252. The rolling elements 234 and 240 are ball and/or spherical bearings. The cavity 246 in FIG. 6 is therefore defined between the base 259 (see FIG. 4) of the lower race 236, a surface of the component 278, and a top surface of the insert 250.

Figure 7:
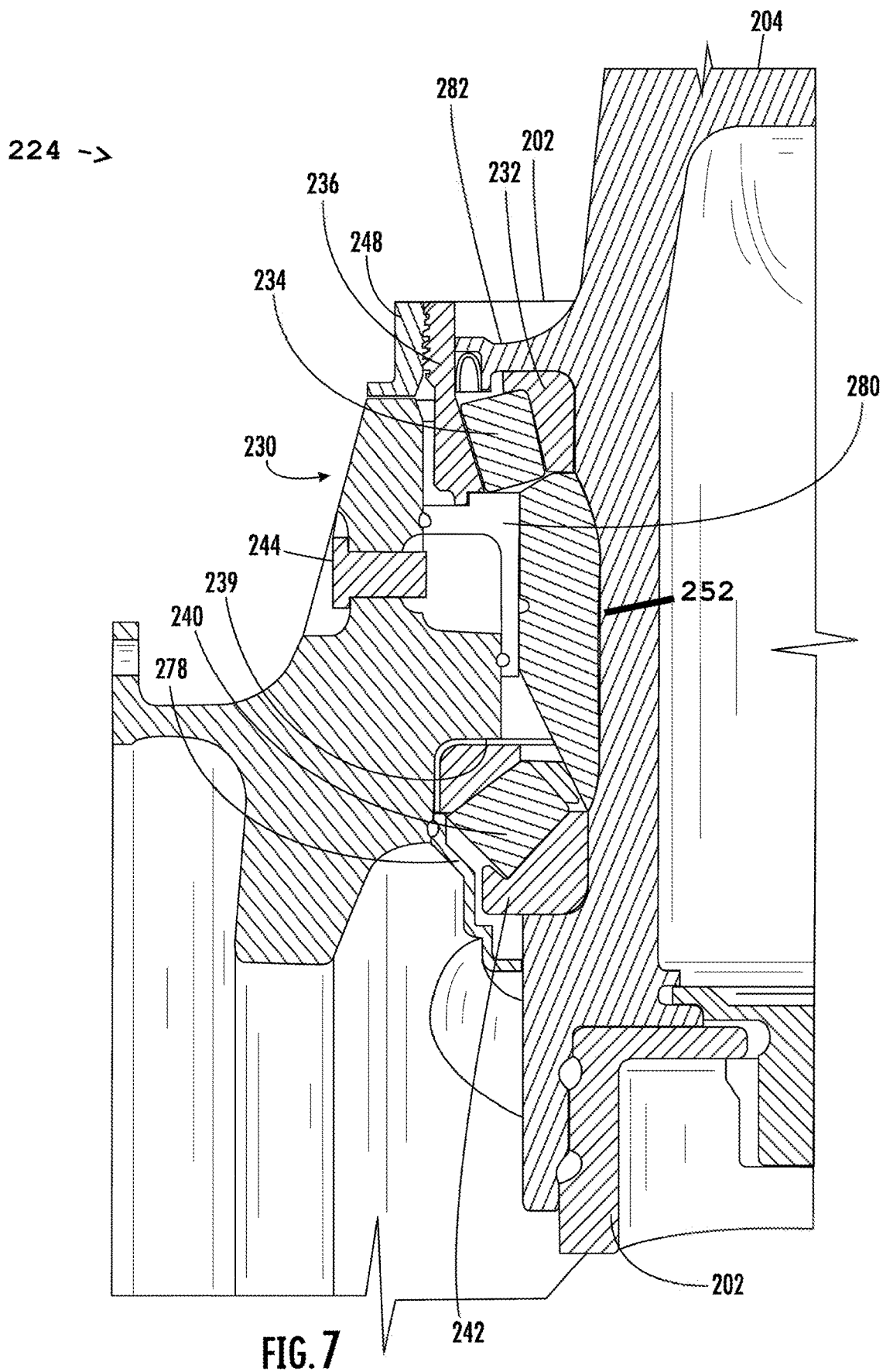
FIG. 7 is a schematic view of a trunnion-to-disk connection in accordance with yet another exemplary aspect of the present disclosure.

Turning now to FIG. 7, and with reference to FIG. 4, another embodiment of the trunnion-to-disk connection 224 is illustrated. Like reference numerals refer to like elements. Differences in the embodiment depicted in FIG. 7 include the absence of a base 259 and a downturned leg 261 in the lower race 236 of the top bearing 226. The absence of the base 259 and the downturned leg 261 of the lower race 236 provides a greater flexibility in the lower race 236 as compared to a lower race 236 having the base 259 and downturned leg 261. Instead of the base 259 of the lower race 236 defining a top part of the cavity 246, a sleeve 280 is positioned such that a lateral extension of the sleeve defines a top part of the cavity 246, and a lower extending arm defines a lateral wall of the cavity 246 opposite the hydraulic port 244. A shelf of the fan disk 208 forms a bottom part of the cavity 246. The lower extending arm of the sleeve 280 is positioned between the insert 252 and an inner surface of the fan disk 208.

Figure 8:
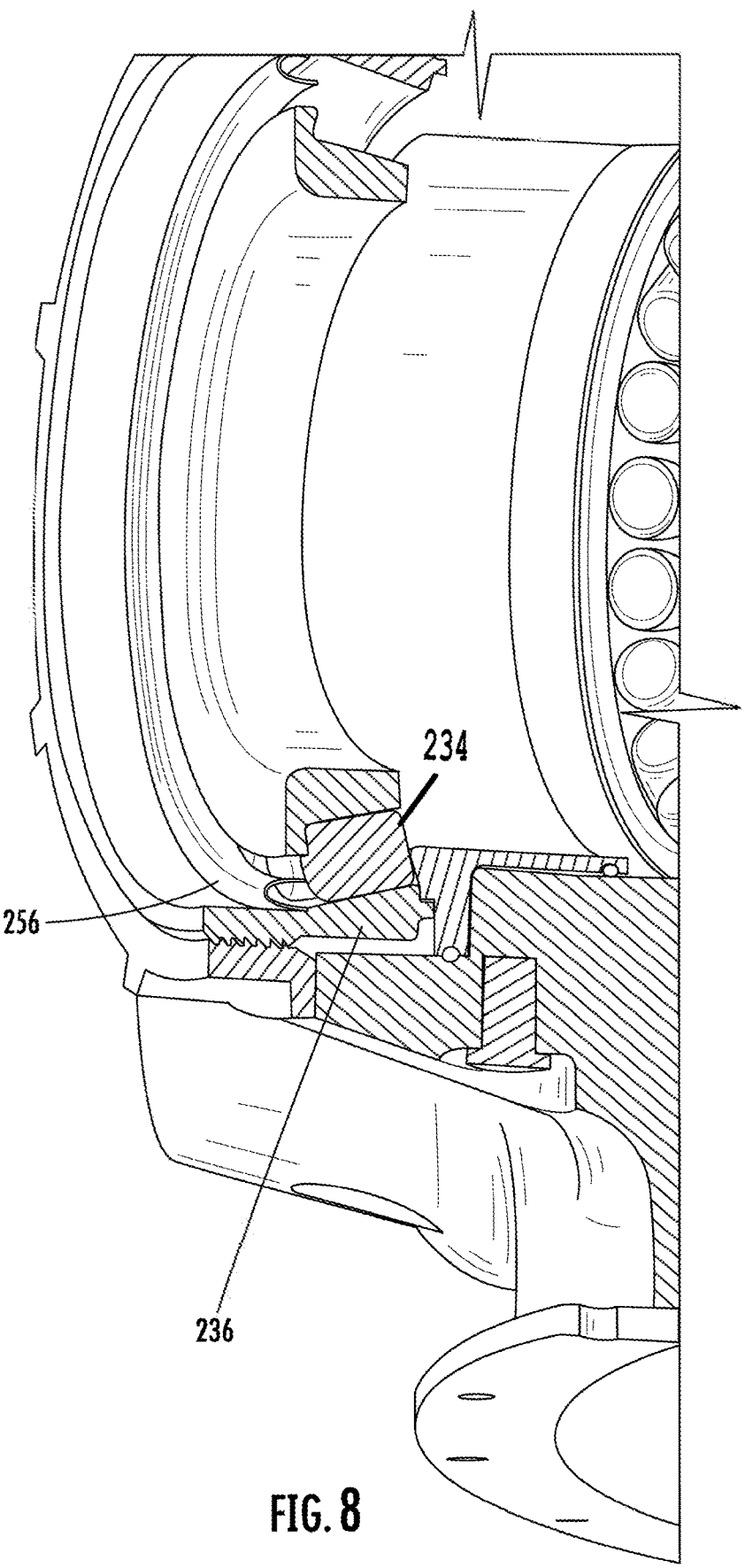
FIG. 8 is a schematic view of a portion of the trunnion-to-disk connection of FIG. 7 illustrating a C-shaped seal in accordance with an exemplary aspect of the present disclosure.

FIG. 8 depicts a portion of the structure shown in FIG. 7, and specifically illustrates an embodiment of a C-shaped seal 256 located an upper portion of lower race 236 and near an upper portion of the rolling element 234 and an extending flange 282 of the trunnion 202 (shown in FIG. 7). The cross section of the C-shaped seal is seen to have its open end on an axial side of the seal, but it will be appreciated that other C-shaped seals in other locations on the assemblies described herein can have the open end of the c-shape on a radially outer end of the seal.

Figure 9:
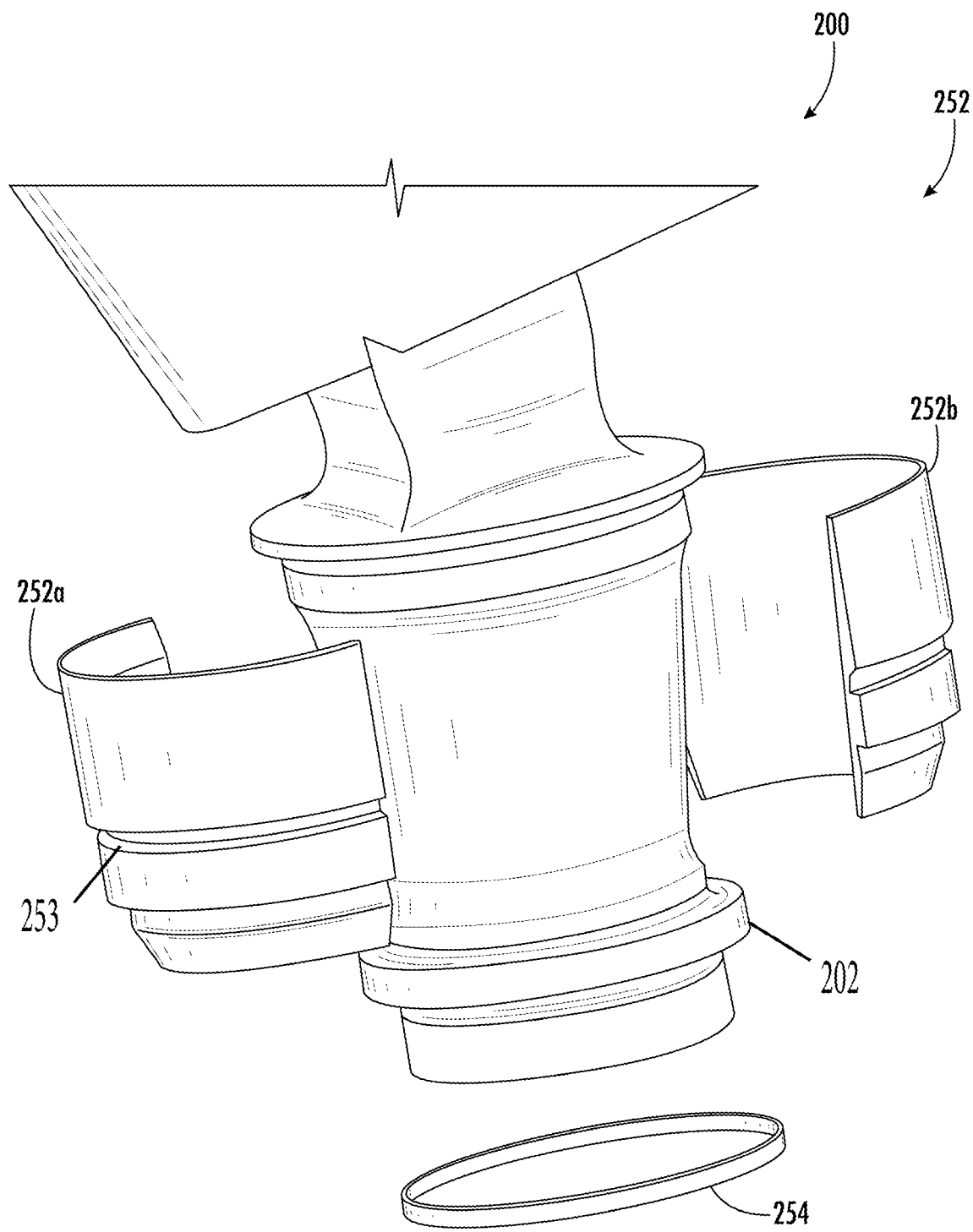
FIG. 9 is a schematic view of a split insert prior to installation on a trunnion in accordance with an exemplary aspect of the present disclosure.
Figure 10:
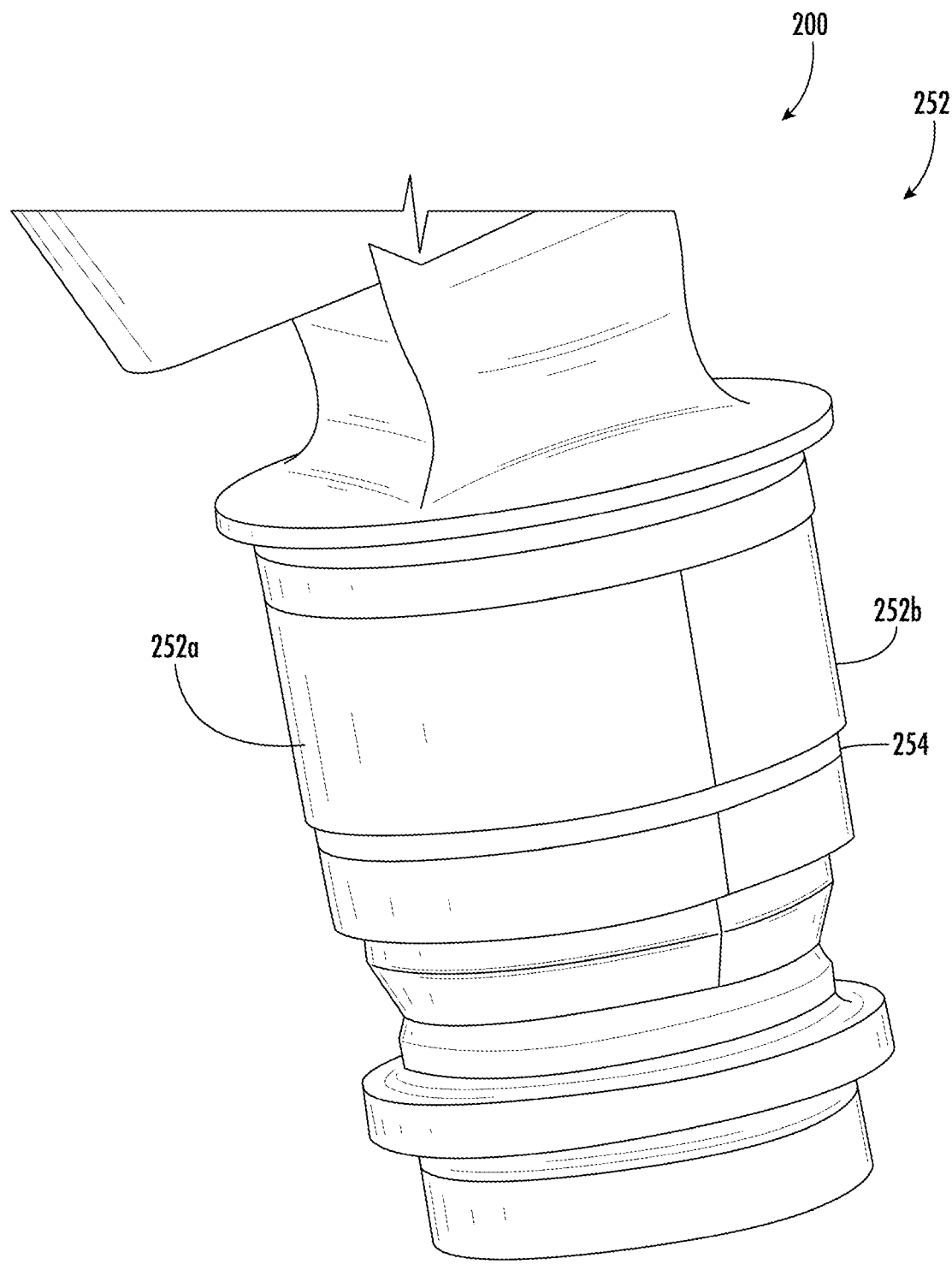
FIG. 10 is a schematic view of the split insert of FIG. 9 installed on the trunnion in accordance with an exemplary aspect of the present disclosure.

Turning now to FIGS. 9-27, an assembly process is shown illustrating various steps useful in constructing the trunnion-to-disk connection 224 (FIGS. 4, 6, and 7) of the integral trunnion and blade spar 200. As will be appreciated, the steps outlined in the FIGS. 9-27 can be performed out of order owing to the separate nature of some steps and/or the involvement of different structures in the different steps. FIGS. 9 and 10 illustrate the attachment of the insert 252 to the trunnion 202, where the insert 252 is an insert assembly having inserts 252a and 252b. Each of the inserts 252a and 252b are halves of an annular insert assembly, each of which include a groove 253 formed on an outer surface and into which the O-ring 254 can be inserted. The O-ring 254 can be used for construction purposes only to hold the inserts 252a and 252b in place, but in some embodiments can also serve a dual purpose of sealing as well.

Figure 11:
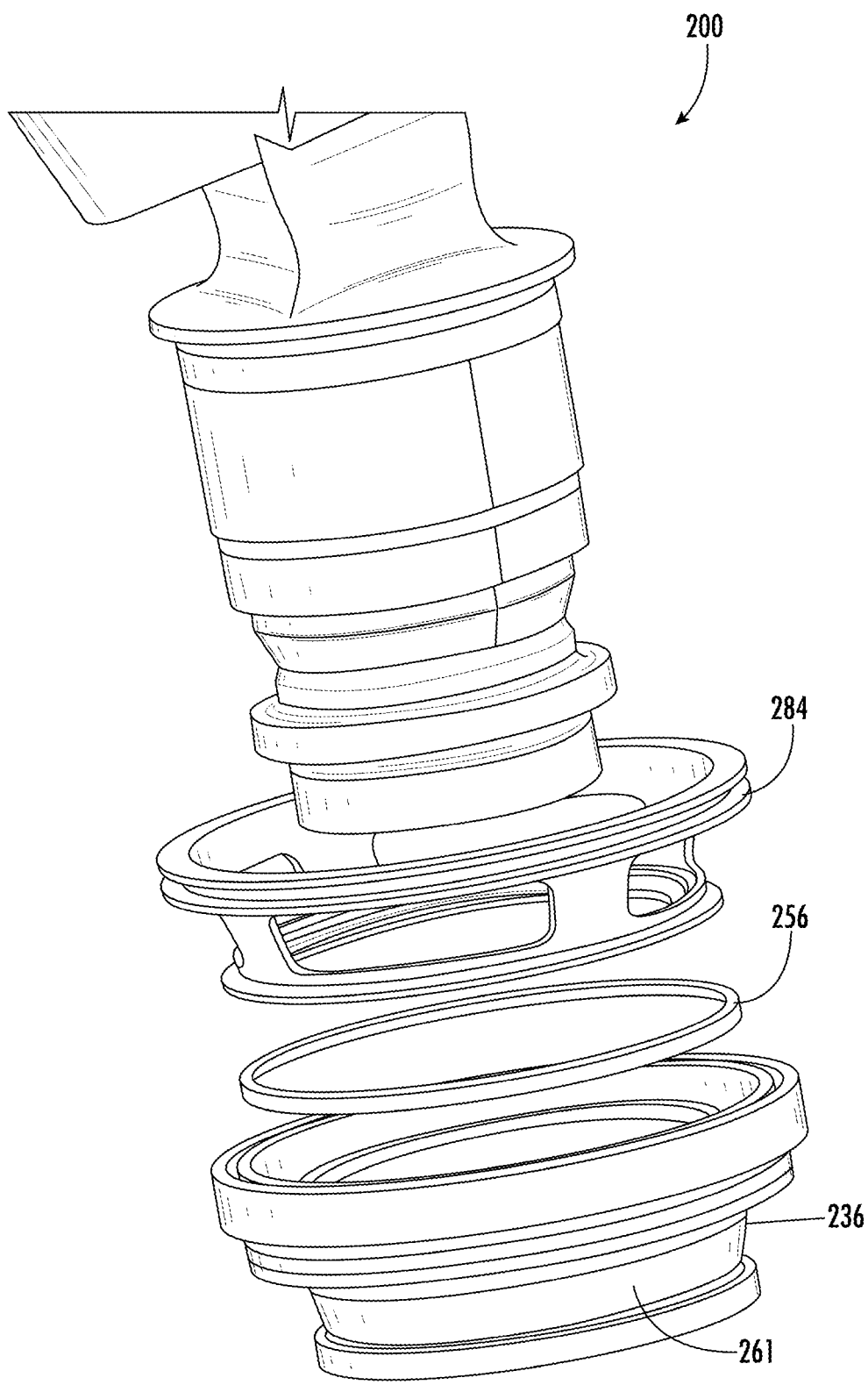
FIG. 11 is a schematic view of an upper bearing prior to installation on a trunnion in accordance with an exemplary aspect of the present disclosure.
Figure 12:
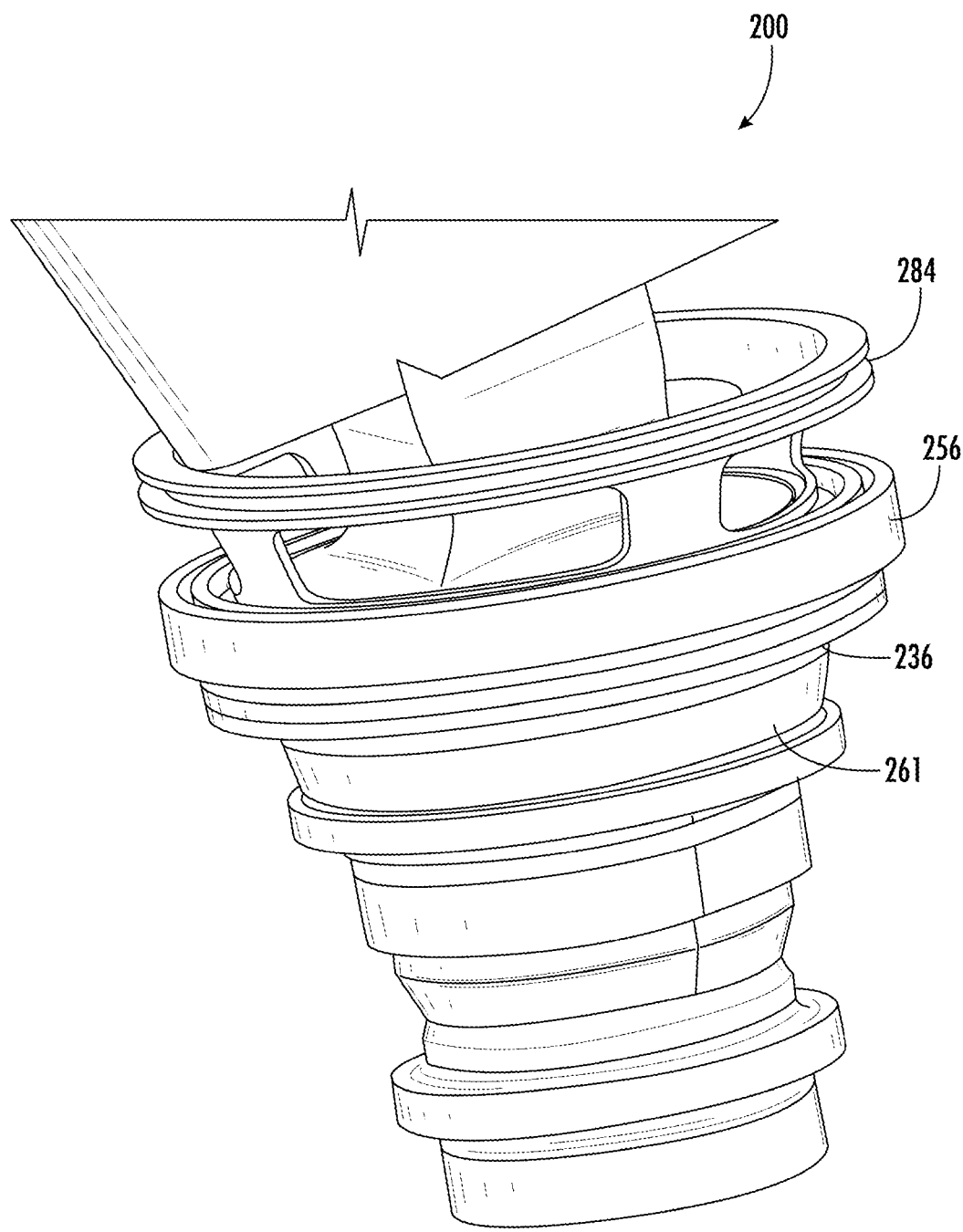
FIG. 12 is a schematic view of the upper bearing of FIG. 11 installed on a trunnion in accordance with an exemplary aspect of the present disclosure.

FIGS. 11 and 12 illustrate the attachment of the lower race 236 (in which the downturned leg 261 is visible), the spanner nut 248 (FIGS. 4, 6, and 7) located about the upturned leg of the lower race 236, C-shaped seal 256, and an assembly scaffold 284 useful in closing out the construction for final installation of the gas turbine engine 100 (FIG. 1) on an aircraft. Various orders of assembly are contemplated of the components depicted in FIG. 11. One particular order is insertion of the assembly scaffold 284 onto the integral trunnion and blade spar 200, followed by installation of the upper race 232 onto the integral trunnion and blade spar 200, followed by installation of the rolling elements 234 (FIGS. 4, 6, and 7) and lower race 236 onto the integral trunnion and blade spar 200. Any or all of the various component installations can be by press fit.

Figure 13:
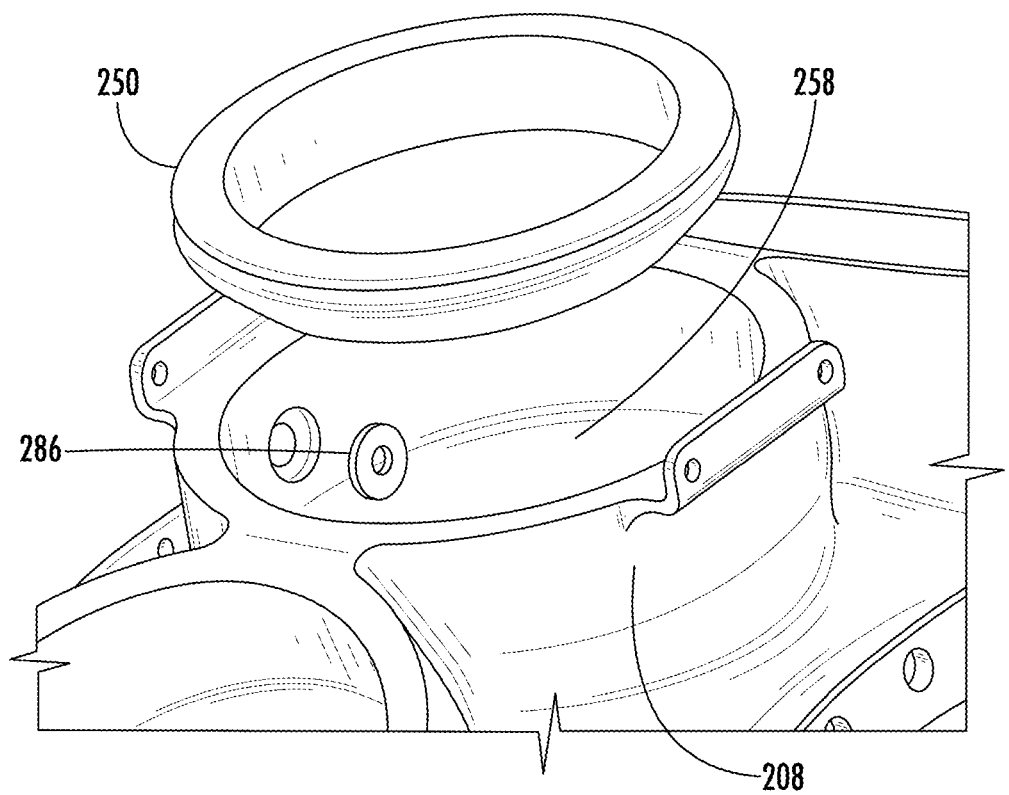
FIG. 13 is a schematic view of an insert prior to installation into a trunnion aperture of a fan disk in accordance with still another exemplary aspect of the present disclosure.
Figure 14:
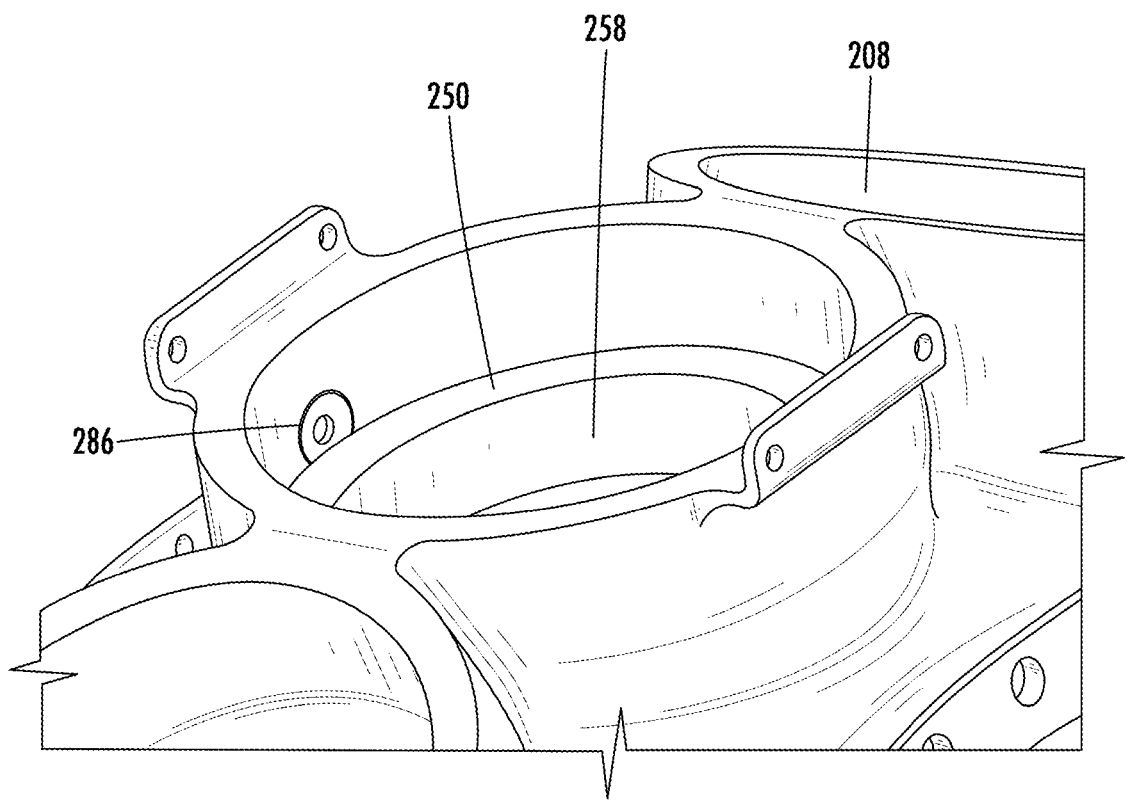
FIG. 14 is a schematic view of the insert of FIG. 13 upon installation into the trunnion aperture of the fan disk in accordance with still another exemplary aspect of the present disclosure.
Figure 15:
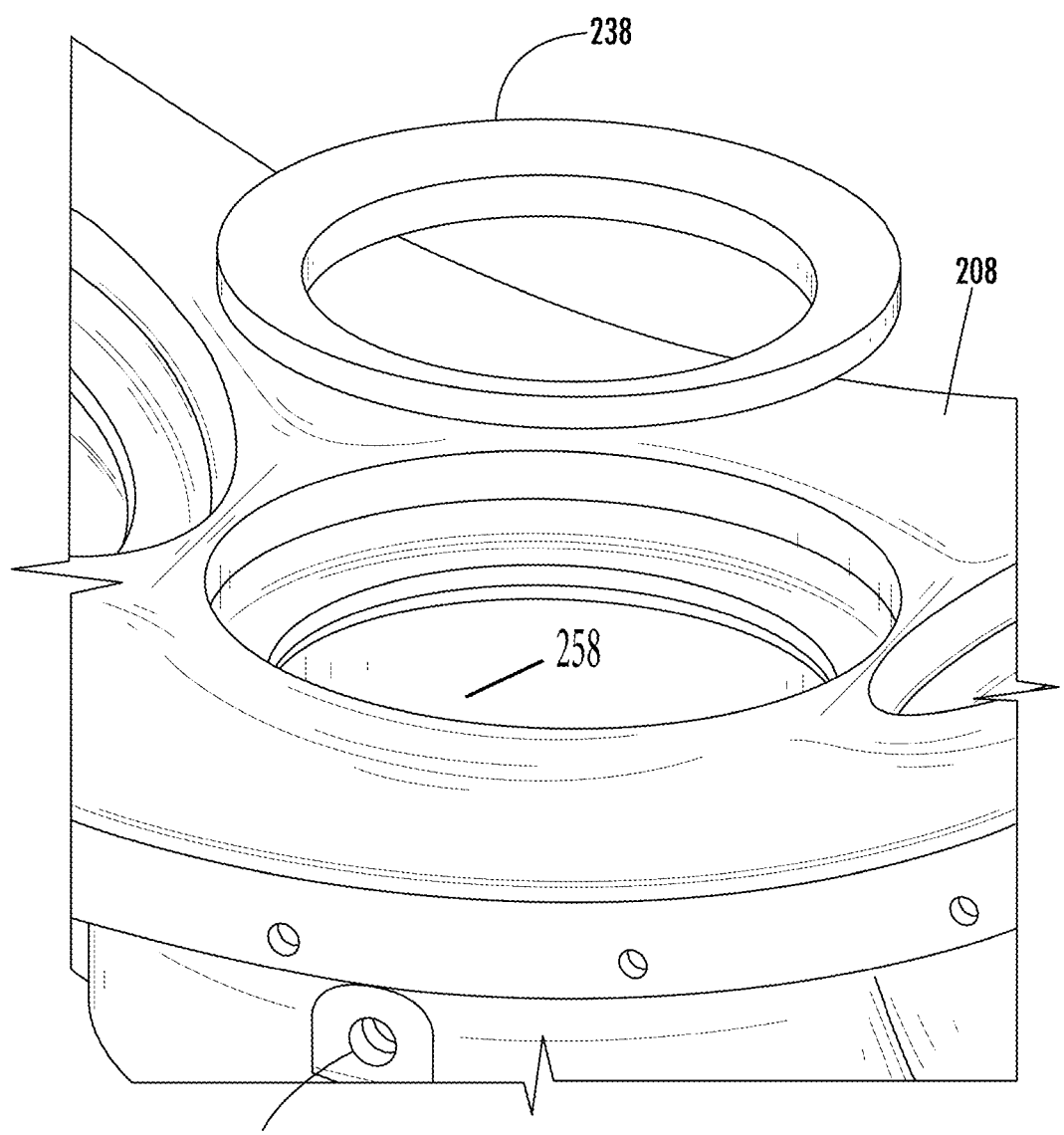
FIG. 15 is a schematic view of a lower race of a bottom bearing prior to installation into a fan disk in accordance with still another exemplary aspect of the present disclosure.
Figure 16:
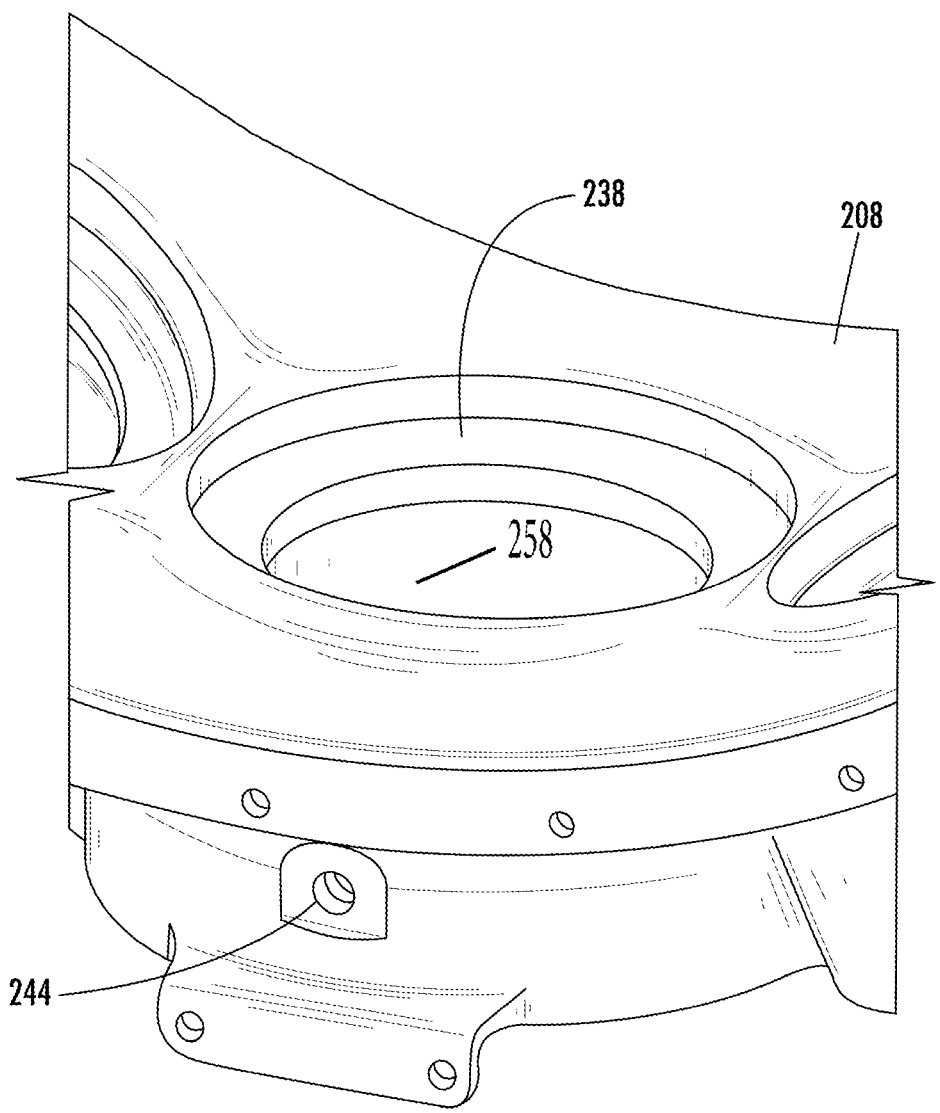
FIG. 16 is a schematic view of a lower race of a bottom bearing depicted in FIG. 15 after installation into the fan disk in accordance with still another exemplary aspect of the present disclosure.

FIGS. 13-16 illustration preparation of the fan disk 208 prior to receipt of the integral trunnion and blade spar 200 having been assembled with the components depicted in FIGS. 9-12. FIGS. 13 and 14 illustrate installation of the insert 250 into the trunnion aperture 258. A hydraulic insert 286 used with the hydraulic lift 230 (FIGS. 4, 6, and 7) is also installed into an inner side wall of the trunnion aperture 258. Both of the hydraulic insert 286 and the insert 250 can be installed using a press fit, but other techniques are also contemplated to fix these components in place in preparation for receipt of the integral trunnion and blade spar 200 having been assembled with the components depicted in FIGS. 9-12. FIGS. 15-16 illustrate the installation of the upper race 238 of the bottom bearing 228 (FIGS. 4, 6, and 7) into the trunnion aperture 258. The upper race can be press fit into place to bear against a surface of the fan disk 208.

Figure 17:
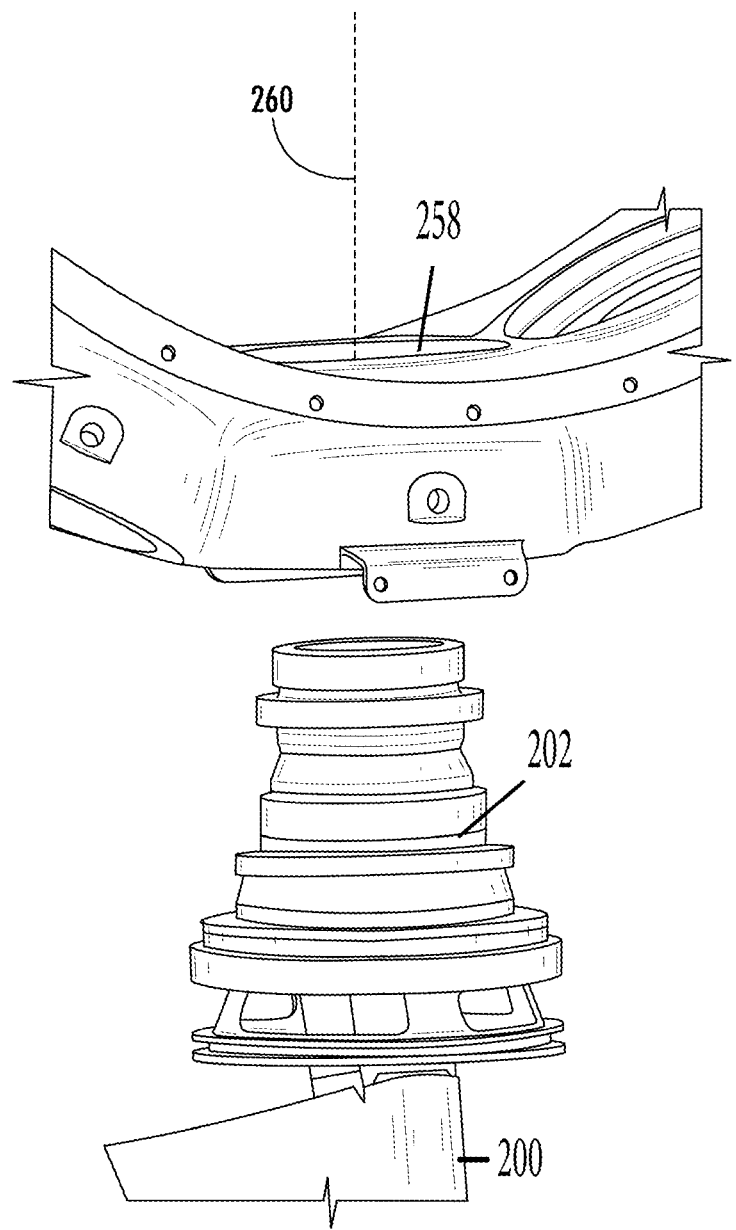
FIG. 17 is a schematic view of an integral trunnion and blade spar prior to installation into a trunnion aperture of a fan disk in accordance with still another exemplary aspect of the present disclosure.
Figure 18:
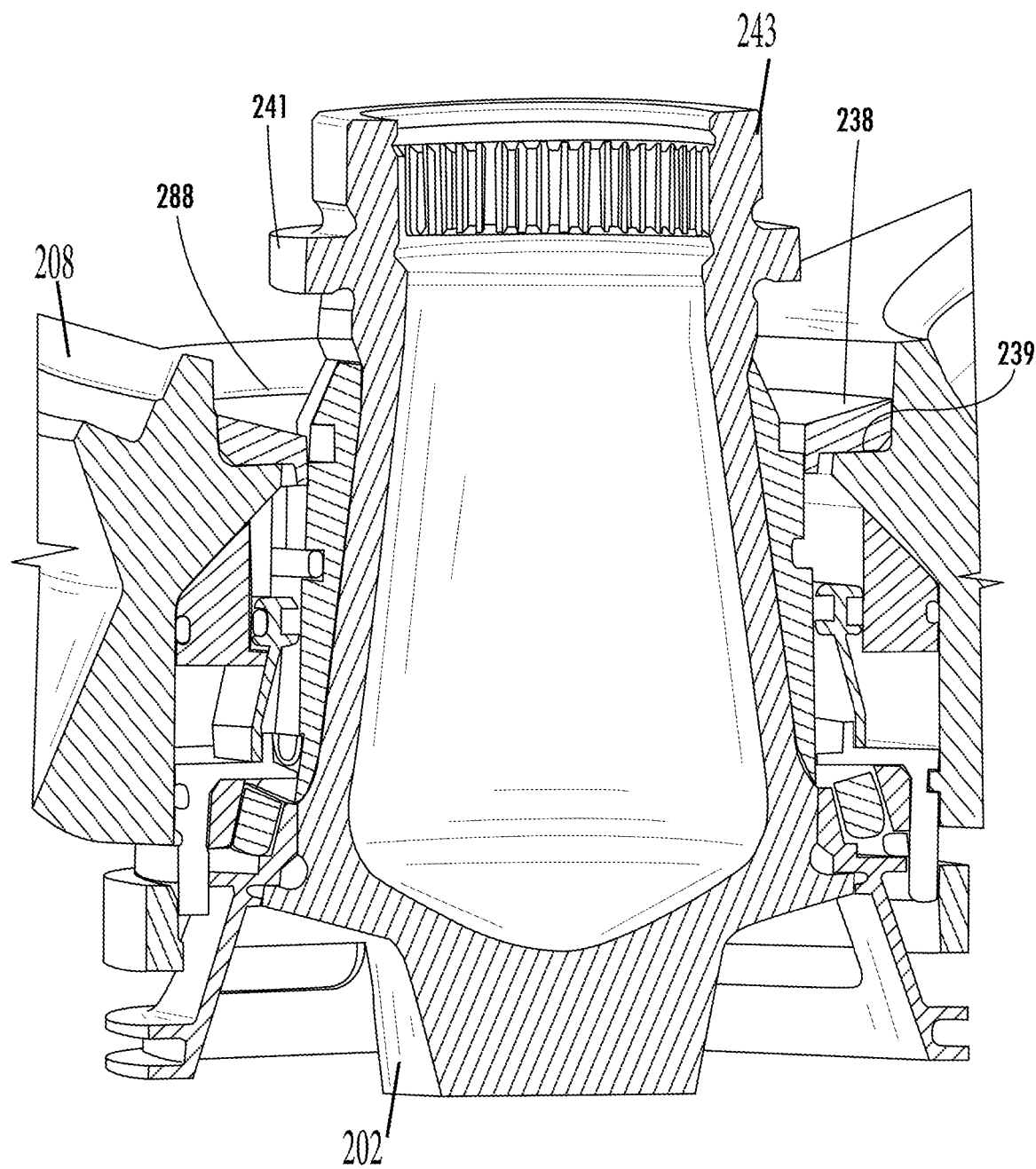
FIG. 18 is a schematic view of an integral trunnion and blade spar of FIG. 17 inserted in the trunnion aperture of the fan disk in accordance with still another exemplary aspect of the present disclosure.

FIG. 17 illustrates a pre-installation position where the integral trunnion and blade spar 200 having been assembled with the components depicted in FIGS. 9-12 is oriented such that the trunnion 202 can be inserted along the central aperture axis 260 of the trunnion aperture 258. When the integral trunnion and blade spar 200 is inserted, it can be guided to a position illustrated in FIG. 18 such that the second end 243 of the trunnion 202 extends past an inner surface of the fan disk 208. The position illustrated in FIG. 18 forms an access space 288 which permits installation of the rolling elements 240 (FIGS. 4, 6, and 7) and the lower race 242 (FIGS. 4, 6, and 7) for the bottom bearing 228 (FIGS. 4, 6, and 7). It will be appreciated that the access space 288 is defined by the foot 241 and inner surface of the fan disk 208, such as overhang 239 and/or the upper race 238 of the bottom bearing 228.

Figure 19:
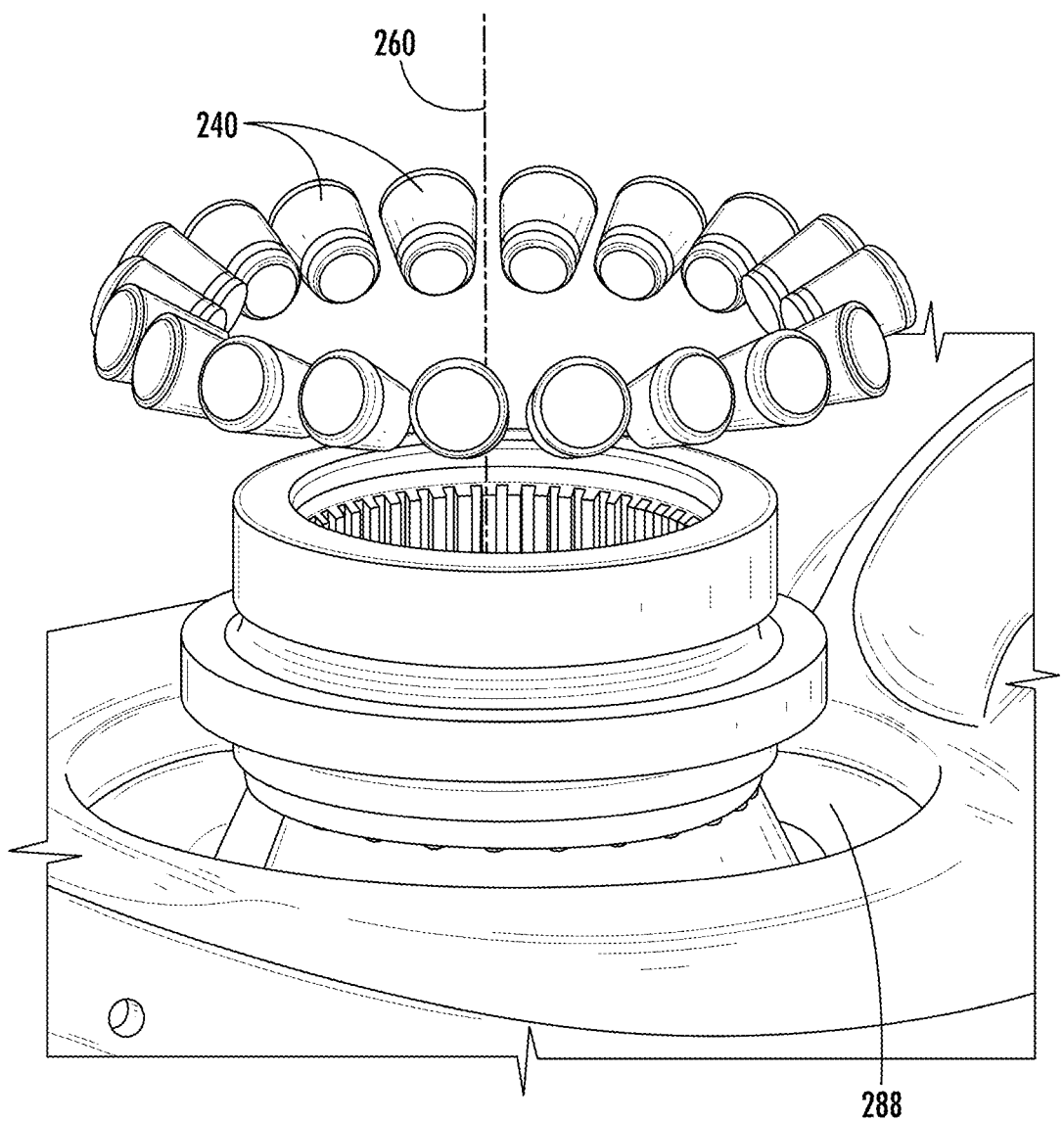
FIG. 19 is a schematic view of rolling elements of a bottom bearing prior to integration into in a bottom bearing of a trunnion-to-disk connection in accordance with still another exemplary aspect of the present disclosure.
Figure 20:
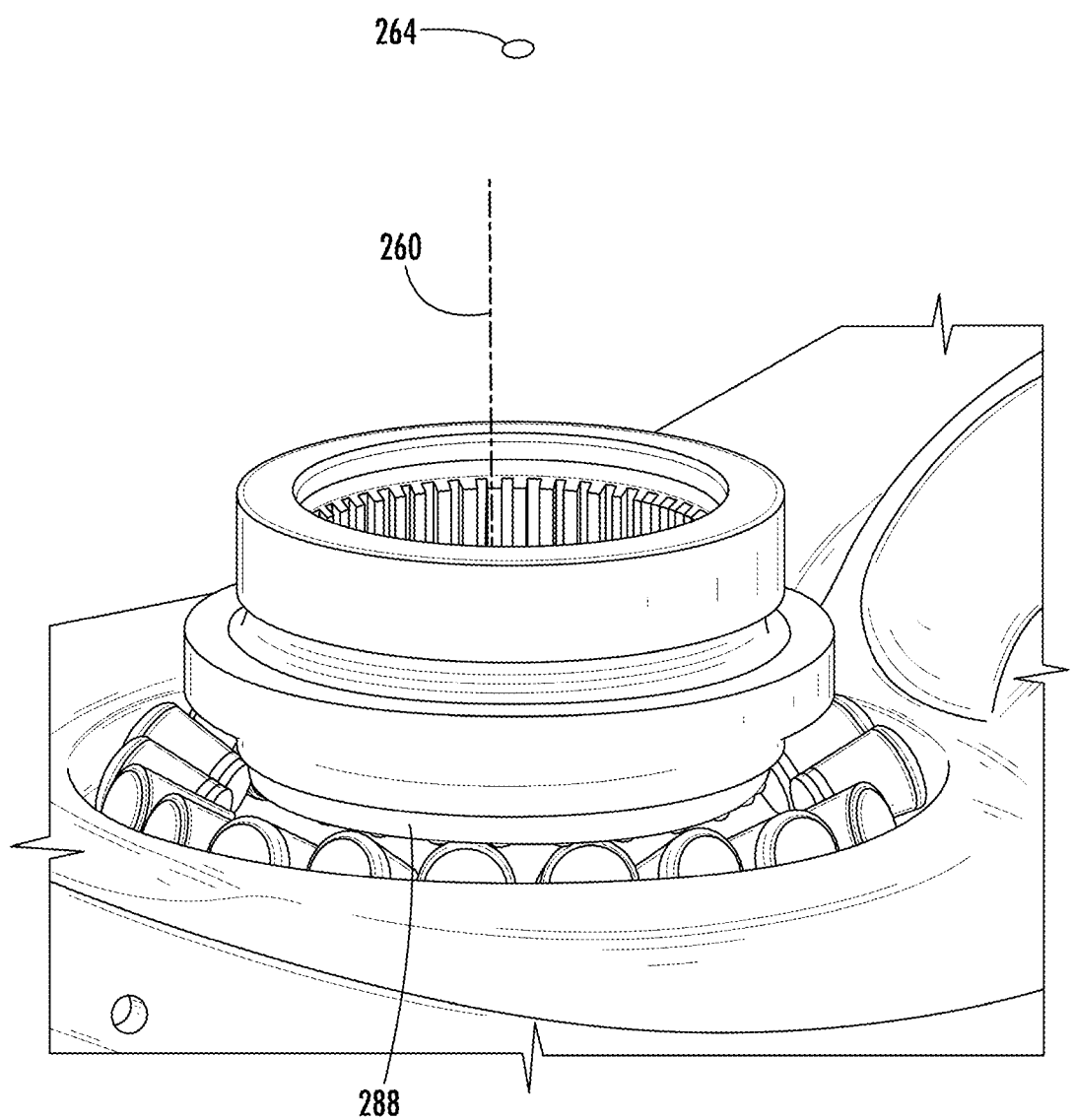
FIG. 20 is a schematic view of rolling elements of the bottom bearing of FIG. 19 prior to installation of a lower bearing race in accordance with still another exemplary aspect of the present disclosure.
Figure 21:
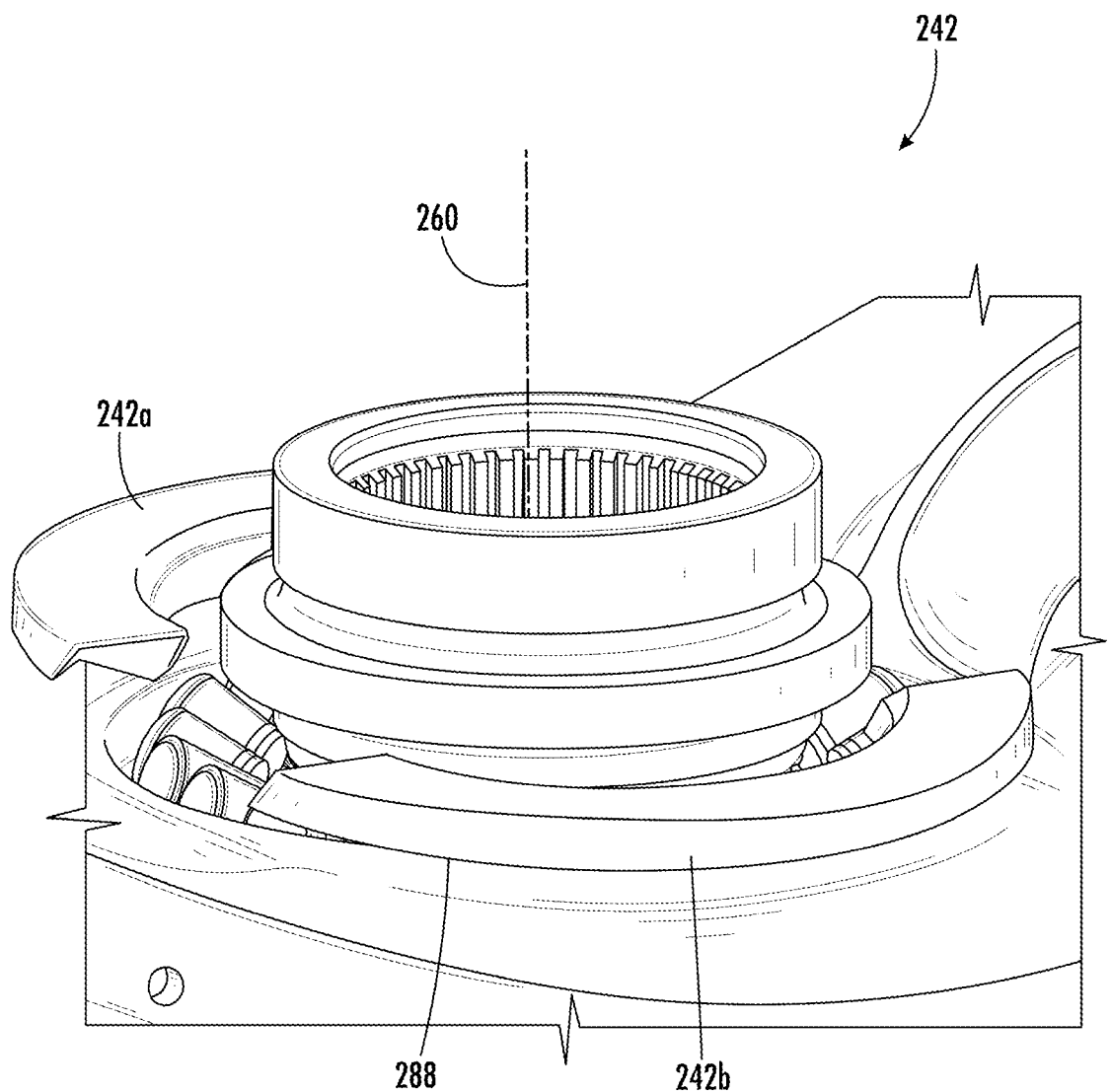
FIG. 21 is a schematic view of a split lower bearing race prior to installation in a bottom bearing in accordance with still another exemplary aspect of the present disclosure.
Figure 22:
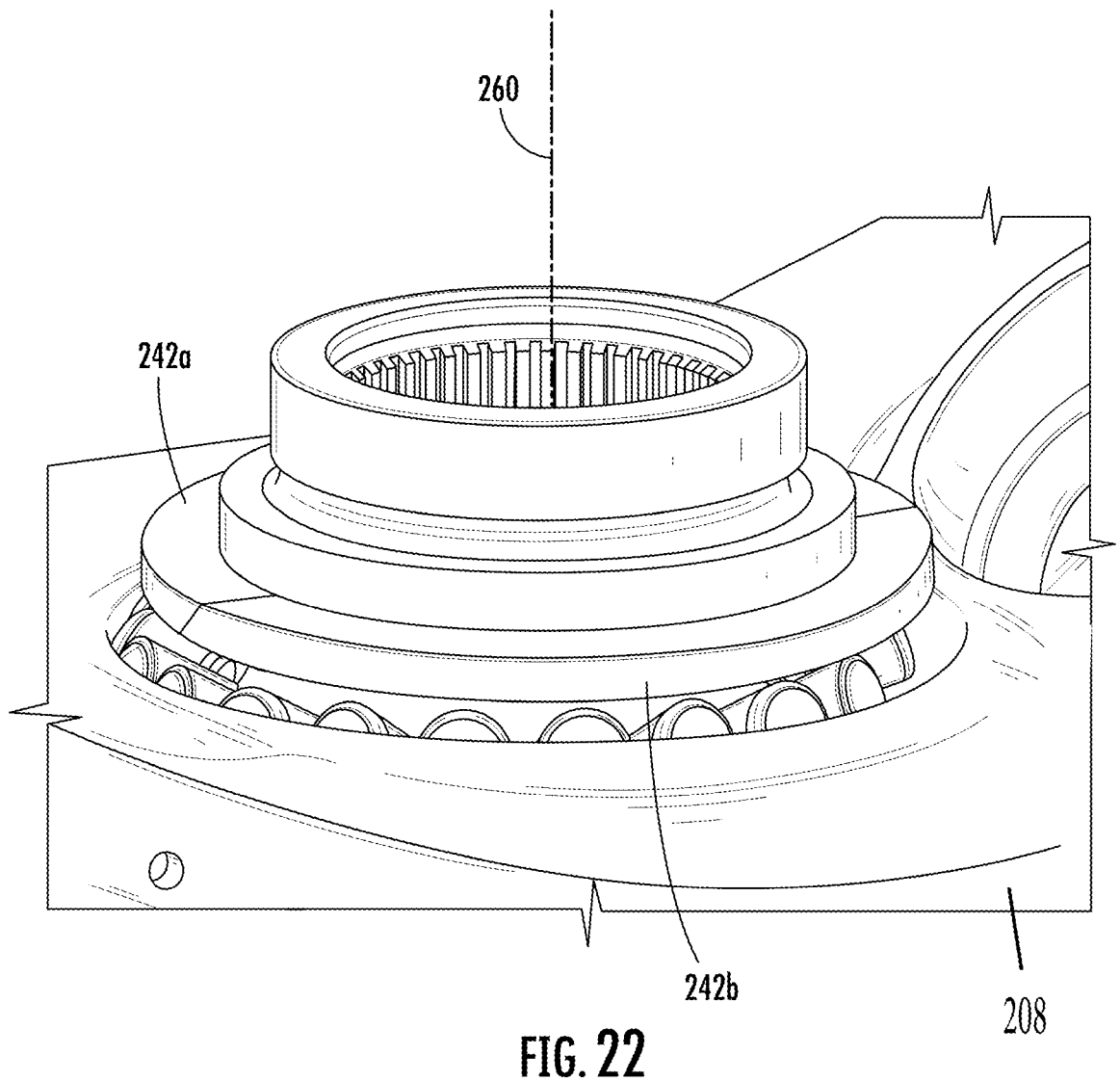
FIG. 22 is a schematic view of a split lower bearing race of FIG. 21 after installation in the bottom bearing in accordance with still another exemplary aspect of the present disclosure.
Figure 23:
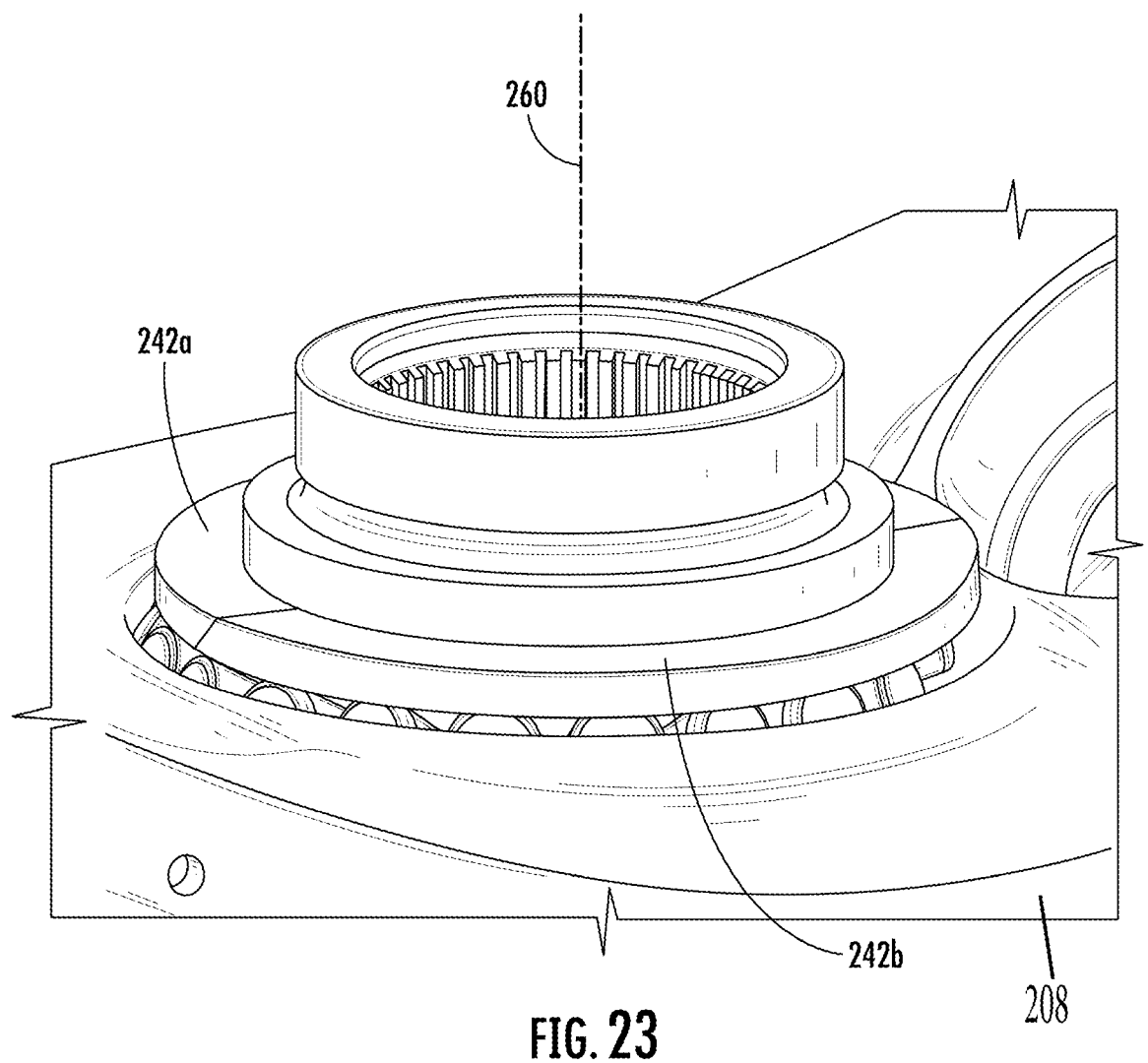
FIG. 23 is a schematic view of the assembly in FIG. 21 after pressurization of a hydraulic lift to engage a foot of a trunnion with a lower bearing race of a bottom bearing in accordance with still another exemplary aspect of the present disclosure.

FIGS. 19-23 illustrate the installation of the rolling elements 240 into the access space 288, installation of the lower race (in the form of lower races 242a and 242b), and subsequent movement of the integral trunnion and blade spar 200 (FIG. 17) into a final position via the hydraulic lift 230 (FIGS. 4, 6, and 7) and subsequent tightening of the spanner nut 248 (FIGS. 4, 6, and 7). FIG. 19 depicts several rolling elements 240 prior to insertion into the access space 288. Given the large open interior 264 of the fan disk 208 into which the rolling elements 240 can be initially inserted, the rolling elements 240 are inserted axially (relative to the central aperture axis 260) into a final resting position against the upper race 238 of the bottom bearing 228. It will be appreciated that the foot 241 may require a radial movement (relative to the central aperture axis 260) when in proximity to the foot 241, but the final installation movement is substantially axial in direction. In some embodiments, a cage may be required to space and align the rolling elements correctly. Grease or other lubricant can be applied at this stage. After installation of the rolling elements 240, the lower race 242 can be installed as illustrated in FIG. 21. In the illustrated embodiment the lower race 242 includes lower races 242a and 242b. The separate lower races 242a and 242b can be two halves of a complete lower race 242, but other configurations of a split race assembly are contemplated. Once the lower races 242a and 242b are installed as shown in FIG. 22, the integral trunnion and blade spar 200 is ready for lowering into a final position via the hydraulic lift 230. The hydraulic lift 230 as discussed above is capable of delivering hydraulic fluid into the cavity 246 (FIGS. 4, 6, and 7) and thereafter drive the integral trunnion and blade spar 200 along the central aperture axis 260. It is contemplated that hydraulic pressure of about 2000 pounds per square inch (psi) can be used to achieve a full preload for the top bearing 226 (FIGS. 4, 6, and 7) and bottom bearing 228 (FIGS. 4, 6, and 7). Once a pressure target is achieved, the spanner nut 248 (FIGS. 4, 6, and 7) can be hand tightened and, if desired, a final seating torque applied with a tool, which may or may not be a calibrated torque tool. When pressure is released from the hydraulic lift 230, the spanner nut 248 holds the preload. FIG. 23 depicts a final installation position of the integral trunnion and blade spar 200. Note the gap between the lower races 242a and 242b with respect to the fan disk 208 as illustrated in FIG. 22 (ready for final position) and as illustrated in FIG. 23 (final position).

Figure 24:
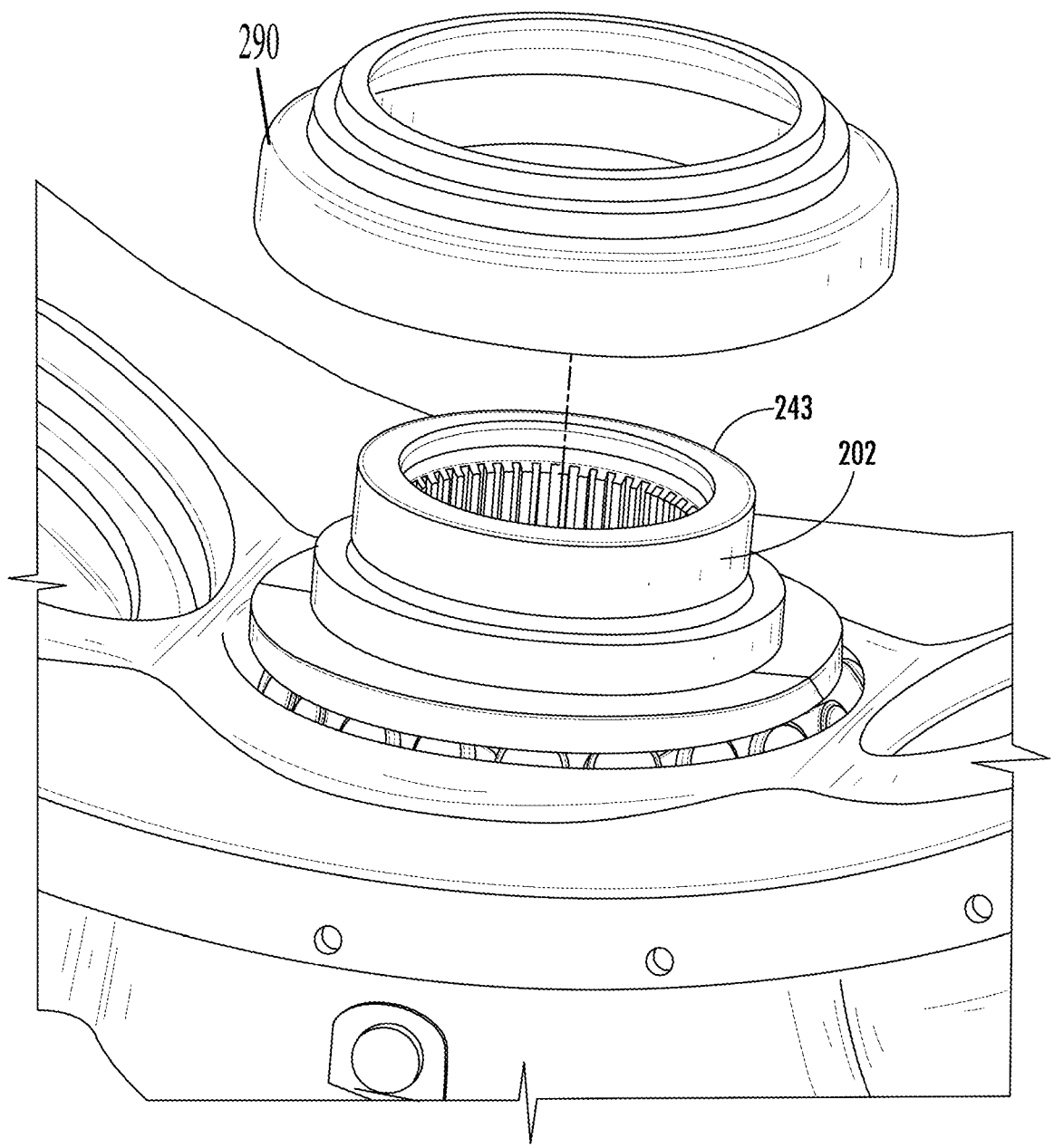
FIG. 24 is a schematic view of a grease cap prior to installation to cover a lower bearing on a trunnion-to-disk connection in accordance with still another exemplary aspect of the present disclosure.
Figure 25:
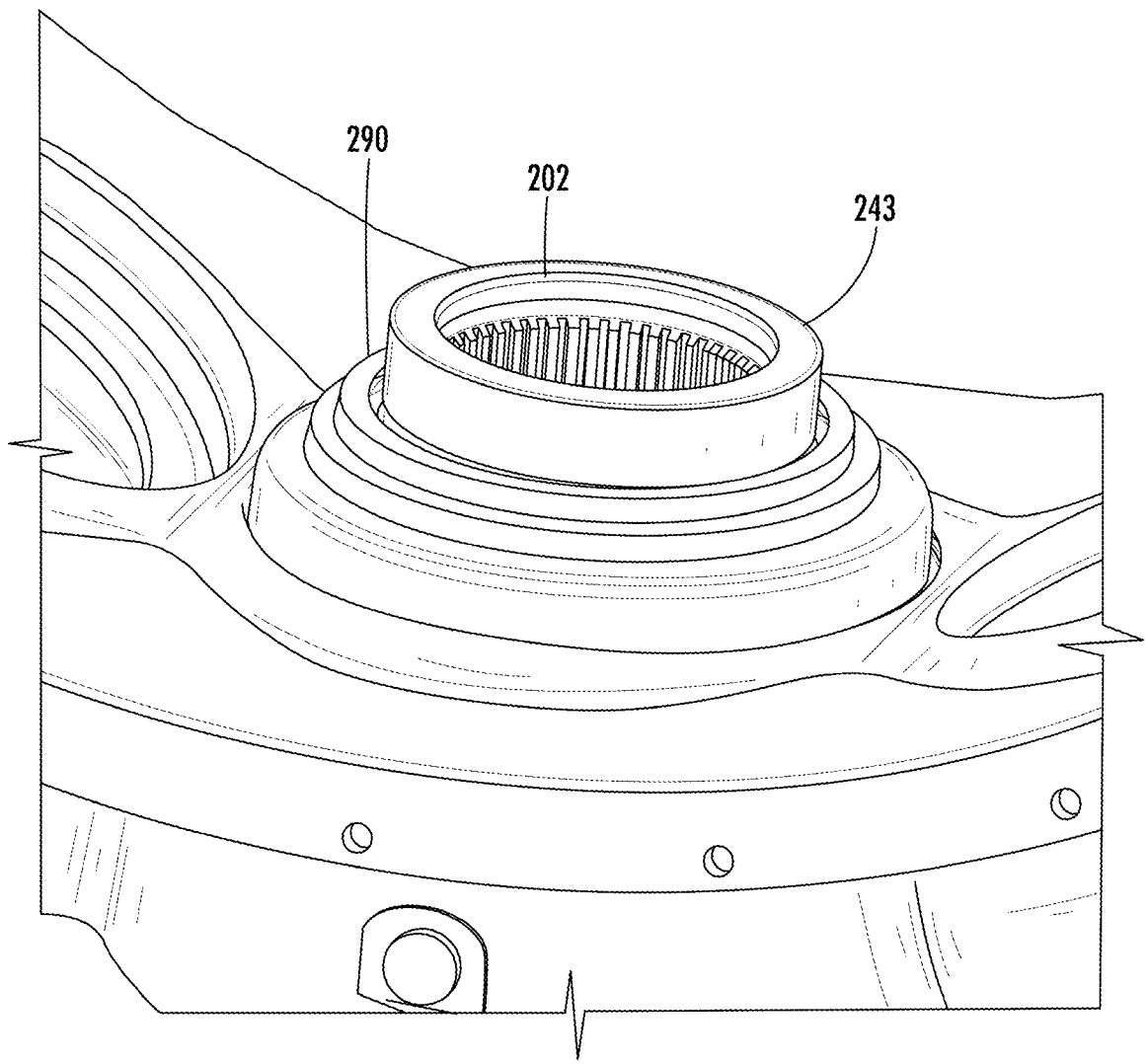
FIG. 25 is a schematic view of the grease cap of FIG. 24 after installation to cover the lower bearing on the trunnion-to-disk connection in accordance with still another exemplary aspect of the present disclosure.

FIGS. 24 and 25 illustrate a final close out device in the form of a grease cap 290 installed about the bottom bearing 228 (FIGS. 4, 6, and 7) to enclose the bottom bearing 228 and discourage leakage of grease away from the bottom bearing 228 and also prevent the intrusion of debris into the bottom bearing 228. The grease cap 290 can be affixed into place by using any variety of techniques including press fit around the second end 243 of the trunnion 202.

As will be appreciated from the discussion herein, each trunnion-to-disk connection 224 (FIGS. 4, 6, and 7) for each integral trunnion and blade spar 200 (FIGS. 4, 6, and 7) is independently sealed such that each integral trunnion and blade spar 200 is in lubricant isolation from one another integral trunnion and blade spar 200 and the lubricant is not shared during operation of the gas turbine engine 100 (FIG. 1) between any of the trunnion-to-disk connections 224.

Figure 26:
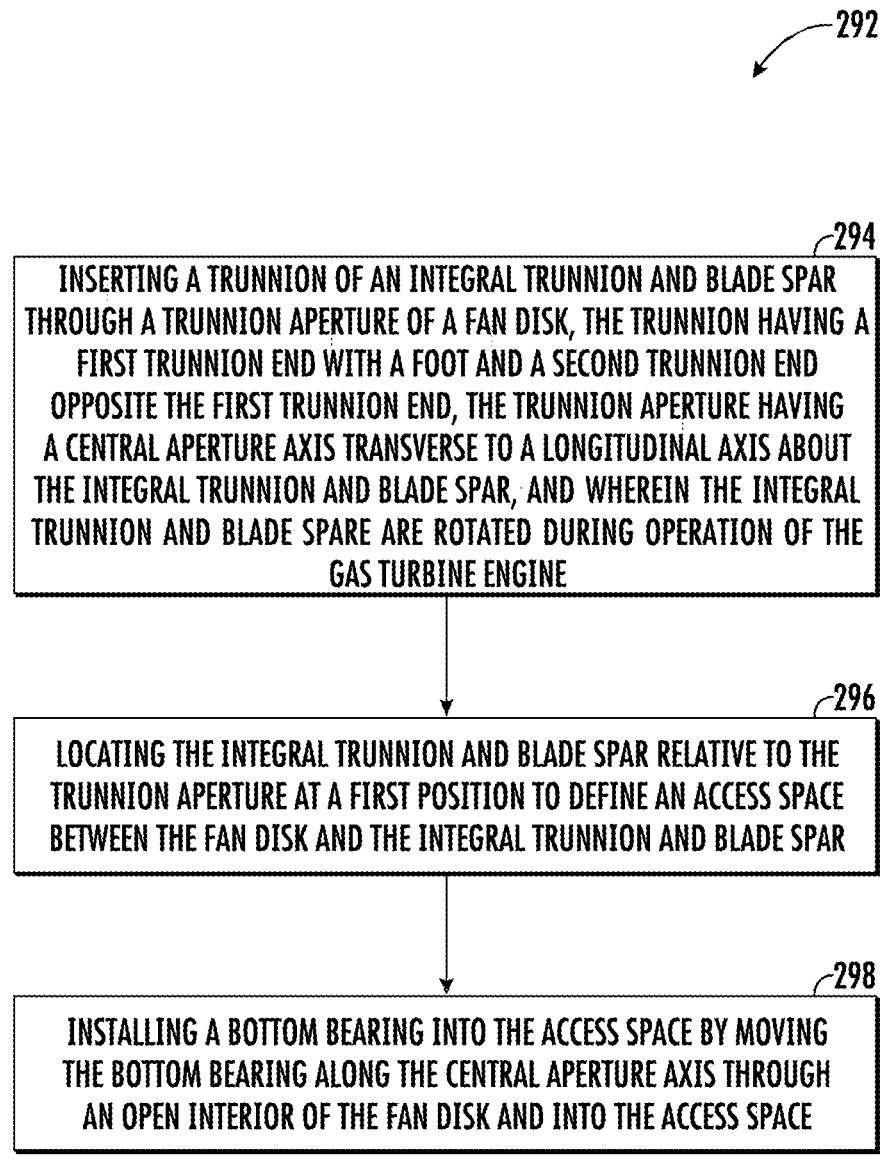
FIG. 26 is a flow chart describing a method of attaching an integral trunnion and blade spar to a fan disk of a gas turbine engine in accordance with the present disclosure.

FIG. 26 discloses a method 292 of attaching an integral trunnion and blade spar 200 to a fan disk 208 of a gas turbine engine 100. Step 294 includes inserting a trunnion 202 of the integral trunnion and blade spar 200 through a trunnion aperture 258 of a fan disk 208, the trunnion 202 having a first trunnion end 237 with a foot 241 and a second trunnion end 243 opposite the first trunnion end 237, the trunnion aperture 258 having a central aperture axis 260 transverse to a longitudinal axis 112 about the integral trunnion and blade spar 200, and wherein the integral trunnion and blade spar 200 are rotated during operation of the gas turbine engine 100. Step 296 includes locating the integral trunnion and blade spar 200 relative to the trunnion aperture 258 at a first position to define an access space 288 between the fan disk 208 and the integral trunnion and blade spar 200. Step 298 includes installing a bottom bearing 228 into the access space 288 by moving the bottom bearing 228 along the central aperture axis 260 through an open interior 264 of the fan disk 208 and into the access space 288.

The connection arrangement between the integral trunnion and blade spar 200 and the fan disk 208 of a gas turbine engine 100 provides various technical effects, including the ability to independently pack and lubricate the bottom bearing 228. The higher radius ratio provided by the connection arrangement permits the large open interior 264 of the fan disk 208 into which the rolling elements 240 can be initially inserted into a final resting position against the upper race 238 of the bottom bearing 228. Such a large open interior 264 can permit visual inspection of the rolling elements 240 as opposed to a blind insertion as in the prior art above.

Further aspects are provided by the subject matter of the following clauses:

A trunnion-to-disk connection for an open fan engine, the trunnion-to-disk connection comprising: a fan disk having an annular shape defined about a longitudinal axis, the fan disk defining a plurality of trunnion apertures and an inner surface, the inner surface defining a minimum radius from the longitudinal axis at a location aligned with the plurality of trunnion apertures, the plurality of trunnion apertures including a first aperture; a plurality of fan blades including a first fan blade having a central blade axis, the first fan blade further including an integral trunnion and blade spar positioned at least partially in the first aperture of the fan disk, a trunnion of the integral trunnion and blade spar including a first trunnion end including a foot and a second trunnion end opposite the first trunnion end, the foot having a bearing contact surface; and a bottom bearing captured between the bearing contact surface of the foot of the trunnion and the inner surface of the fan disk, the bearing contact surface defining a radius from the longitudinal axis less than the minimum radius of the inner surface of the fan disk; and wherein an access space is defined by the inner surface of the fan disk and the foot of the integral trunnion and blade spar, the access space configured to facilitate loading of the bottom bearing.

The trunnion-to-disk connection of the preceding clause, wherein the bottom bearing includes a rolling element captured between an upper race and lower race, wherein the lower race is a split race.

The trunnion-to-disk connection of any preceding clause, wherein each of the plurality of trunnion apertures includes a central aperture axis oriented coincident with the central blade axis.

The trunnion-to-disk connection of any preceding clause, wherein each of the plurality of trunnion apertures includes a central aperture axis, and wherein the integral trunnion and blade spar is structured to rotate about the central aperture axis to provide variable pitch to each of the plurality of fan blades.

The trunnion-to-disk connection of any preceding clause, wherein the foot extends transverse to the central aperture axis and away from the trunnion.

The trunnion-to-disk connection of any preceding clause, wherein the fan disk includes an inner abutment surface for bearing a load of at least one of the plurality of fan blades, which further includes a spanner nut located at the second trunnion end of the integral trunnion and blade, and wherein tightening of the spanner nut urges the foot to capture the bottom bearing between the foot and the inner abutment surface.

The trunnion-to-disk connection of any preceding clause, further comprising a top bearing and a foam insert, the foam insert positioned between the bottom bearing and the top bearing.

The trunnion-to-disk connection of any preceding clause, further comprising a top bearing, wherein a cavity is defined between the fan disk and the trunnion of the integral trunnion and blade, the cavity also defined between the top bearing and the bottom bearing.

The trunnion-to-disk connection of any preceding clause, wherein a cavity is defined between the fan disk and the trunnion of the integral trunnion and blade, and wherein the cavity is in lubricant isolation from another cavity defined between another integral trunnion and blade spar and the fan disk.

The trunnion-to-disk connection of any preceding clause, wherein each of the plurality of trunnion apertures includes a central aperture axis oriented to extend radially toward the longitudinal axis of the fan disk, and wherein the trunnion-to-disk connection further includes a grease port in fluid communication with the cavity, wherein the grease port is structured to deliver pressurized grease to the cavity to aid in forcing movement of the integral trunnion and blade spar along the central aperture axis.

The trunnion-to-disk connection of any preceding clause, wherein the fan disk is coupled to a low pressure shaft of a gas turbine engine, and which further includes the gas turbine engine.

The trunnion-to-disk connection of any preceding clause, wherein one or both of the top bearing and the bottom bearing have rolling elements of a spherical type.

The trunnion-to-disk connection of any preceding clause, wherein one or both of the top bearing and the bottom bearing have rolling elements of a ball type.

The trunnion-to-disk connection of any preceding clause, wherein one or both of the top bearing and the bottom bearing have rolling elements of a cylindrical type.

The trunnion-to-disk connection of any preceding clause, wherein one or both of the top bearing and the bottom bearing have rolling elements of a tapered roller type.

The trunnion-to-disk connection of any preceding clause, wherein one or both of the top bearing and the bottom bearing have rolling elements of a needle roller type.

The trunnion-to-disk connection of any preceding clause, wherein a lower race of the top bearing includes at least one of an upturned leg, a base, and a downturned leg.

The trunnion-to-disk connection of any preceding clause, wherein a lower race of the top bearing includes a downturned leg, and which further includes an additional element adjacent the downturned leg.

The trunnion-to-disk connection of any preceding clause, which further includes at least one of an O-ring and a C-ring to discourage the passage of lubricant therethrough.

A powerplant system comprising: gas turbine engine, a fan section having a fan blade with an integral trunnion and blade spar, a fan disk for coupling with the fan blade, and a trunnion-to-disk connection used to connect the fan disk with the fan blade.

A method of attaching an integral trunnion and blade spar to a fan disk of a gas turbine engine, the method comprising: (a) inserting a trunnion of the integral trunnion and blade spar through a trunnion aperture of the fan disk, the trunnion having a first end with a foot and a second trunnion end opposite the first trunnion end, the trunnion aperture having a central aperture axis transverse to a longitudinal axis about which the integral trunnion and blade spar are rotated during operation of the gas turbine engine; (b) locating the integral trunnion and blade spar relative to the trunnion aperture at a first position to define an access space between the fan disk and the integral trunnion and blade spar; and (c) installing a bottom bearing into the access space by moving the bottom bearing along the central aperture axis through an open interior of the fan disk and into the access space.

The method of the preceding clause, wherein the bottom bearing is separable and having an upper race, a lower race, and a plurality of rolling elements, wherein the installing the bottom bearing includes inserting the upper race into the access space independent of installation of the lower race, inserting each rolling element of the plurality of rolling elements into the access space, and inserting the lower race into the access space.

The method of any preceding clause, wherein the inserting the upper race includes connecting the upper race with an overhang formed in the fan disk.

The method of any preceding clause, wherein a cavity is defined between the fan disk and the trunnion of the integral trunnion and blade, a top bearing and the bottom bearing, the method further comprising pressurizing the cavity to urge the foot into compression with the lower race of the bottom bearing.

The method of any preceding clause, further comprising tightening a spanner nut to the top bearing at the second trunnion end to compress the bottom bearing between the foot of the trunnion and an inner abutment surface of the fan disk, and wherein the pressurizing includes injecting the cavity with a lubricant, and wherein the pressurizing occurs before the tightening of the spanner nut.

The method of any preceding clause, further comprising installing a foam insert into the cavity prior to the pressurizing.

The method of any preceding clause, further comprising translating the top bearing along the central aperture axis as a result of the pressurizing.

The method of any preceding clause, further comprising obtaining another integral trunnion and blade spar and repeating steps (a) through (d) for the another integral trunnion and blade spar.

The method of any preceding clause, further comprising enclosing the bottom bearing associated with the integral trunnion and blade spar and enclosing the bottom bearing associated with the another integral trunnion and blade spar such that the bottom bearing of each of the integral trunnion and blade spar and the another integral trunnion and blade spar are in lubricant isolation from one another.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A trunnion-to-disk connection for an open fan engine, the trunnion-to-disk connection comprising:
    a fan disk having an annular shape defined about a longitudinal axis, the fan disk defining a plurality of trunnion apertures and an inner surface, the inner surface defining a minimum radius from the longitudinal axis at a location aligned with the plurality of trunnion apertures, the plurality of trunnion apertures including a first aperture;
    a plurality of fan blades including a first fan blade having a central blade axis, the first fan blade further including an integral trunnion and blade spar positioned at least partially in the first aperture of the fan disk, a trunnion of the integral trunnion and blade spar including a first trunnion end including a foot and a second trunnion end opposite the first trunnion end, the foot having a bearing contact surface; and
    a bottom bearing captured between the bearing contact surface of the foot of the trunnion and the inner surface of the fan disk, the bearing contact surface defining a radius from the longitudinal axis less than the minimum radius of the inner surface of the fan disk;
    wherein an access space is defined by the inner surface of the fan disk and the foot of the integral trunnion and blade spar, the access space configured to facilitate loading of the bottom bearing.

2. The trunnion-to-disk connection of claim 1, wherein the bottom bearing includes a rolling element captured between an upper race and a lower race, wherein the lower race is a split race.

3. The trunnion-to-disk connection of claim 1, wherein each of the plurality of trunnion apertures includes a central aperture axis oriented coincident with the central blade axis.

4. The trunnion-to-disk connection of claim 1, wherein each of the plurality of trunnion apertures includes a central aperture axis, and wherein the integral trunnion and blade spar is structured to rotate about the central aperture axis to provide variable pitch to each of the plurality of fan blades.

5. The trunnion-to-disk connection of claim 4, wherein the foot extends transverse to the central aperture axis and away from the trunnion.

6. The trunnion-to-disk connection of claim 1, wherein the fan disk includes an inner abutment surface for bearing a load of at least one of the plurality of fan blades, which further includes a spanner nut located at the second trunnion end of the integral trunnion and blade, and wherein tightening of the spanner nut urges the foot to capture the bottom bearing between the foot and the inner abutment surface.

7. The trunnion-to-disk connection of claim 1, further comprising a top bearing and a foam insert, the foam insert positioned between the bottom bearing and the top bearing.

8. The trunnion-to-disk connection of claim 1, further comprising a top bearing, wherein a cavity is defined between the fan disk and the trunnion of the integral trunnion and blade, the cavity also defined between the top bearing and the bottom bearing.

9. The trunnion-to-disk connection of claim 8, wherein a cavity is defined between the fan disk and the trunnion of the integral trunnion and blade, and wherein the cavity is in lubricant isolation from another cavity defined between another integral trunnion and blade spar and the fan disk.

10. The trunnion-to-disk connection of claim 8, wherein each of the plurality of trunnion apertures includes a central aperture axis oriented to extend radially toward the longitudinal axis of the fan disk, and wherein the trunnion-to-disk connection further includes a grease port in fluid communication with the cavity, wherein the grease port is structured to deliver pressurized grease to the cavity to aid in forcing movement of the integral trunnion and blade spar along the central aperture axis.

11. The trunnion-to-disk connection of claim 1, wherein the fan disk is coupled to a low pressure shaft of a gas turbine engine, and which further includes the gas turbine engine.

\* \* \* \* \*